United States Patent
Fernandez Carnero et al.

(10) Patent No.: US 8,472,528 B2
(45) Date of Patent: Jun. 25, 2013

(54) METHOD FOR MARKING A DIGITAL IMAGE WITH A DIGITAL WATER MARK

(75) Inventors: José Luis Fernandez Carnero, Teo-A Coruña (ES); Santiago Rey Requejo, Pontecesures-Pontevedra (ES); Fernando Perez Gonzales, Vigo-Pontevedra (ES); Jorge Rocafort Cimadevila, Marin-Pontevedra (ES); Pedro Comesaña Alfaro, Vigo-Pontevedra (ES); Luis Perez Freire, Marin-Pontevedra (ES); Carlos Mosquera Nartallo, Vigo-Pontevedra (ES); Gabriel Dominguez Conde, O Grove-Pontevedra (ES)

(73) Assignee: Tredess 2010, S.L., Santiago de Compostela (ES)

( * ) Notice: Subject to any disclaimer, the term of this patent is extended or adjusted under 35 U.S.C. 154(b) by 704 days.

(21) Appl. No.: 12/519,050

(22) PCT Filed: Dec. 14, 2007

(86) PCT No.: PCT/EP2007/011013
§ 371 (c)(1),
(2), (4) Date: Jun. 12, 2009

(87) PCT Pub. No.: WO2008/071442
PCT Pub. Date: Jun. 19, 2008

(65) Prior Publication Data
US 2010/0045794 A1   Feb. 25, 2010

(30) Foreign Application Priority Data

Dec. 14, 2006 (ES) .................................. 200603214
Apr. 13, 2007 (DE) ......................... 10 2007 017 525

(51) Int. Cl.
| | |
|---|---|
| *H04N 21/8358* | (2011.01) |
| *H04N 7/18* | (2006.01) |
| *H04N 7/30* | (2006.01) |
| *H04N 21/8547* | (2011.01) |

(52) U.S. Cl.
USPC ................. 375/240.24; 348/143; 375/240.26; 725/31

(58) Field of Classification Search
USPC ............... 348/143; 375/240, 240.16, 240.24, 375/240.26; 725/31
See application file for complete search history.

(56) References Cited

U.S. PATENT DOCUMENTS 6,633,654 B2 * 10/2003 Hannigan et al. ............. 382/100
6,802,074 B1 * 10/2004 Mitsui et al. .................... 725/25

(Continued)

FOREIGN PATENT DOCUMENTS

| EP | 1001604 | 4/2004 |
|---|---|---|
| JP | 2003289435 A | 10/2003 |

OTHER PUBLICATIONS

P.C. Alfaro & F. Pérez-Gonzalez,_Side-Informed Data Hiding: Robustness and Security Analysis_(Jun. 2006).*

(Continued)

*Primary Examiner* — David Czekaj
*Assistant Examiner* — David N Werner
(74) *Attorney, Agent, or Firm* — Donald J. Ranft; Collen IP

(57) ABSTRACT

The invention relates to a method for marking a digital document, especially a digital image, with a digital watermark for the purpose of manipulation recognition while inserting an integrity information and at least one multibit message.

19 Claims, 14 Drawing Sheets

U.S. PATENT DOCUMENTS

| | | | | |
|---|---|---|---|---|
| 6,823,006 | B2 * | 11/2004 | Kalker et al. | 375/240 |
| 6,944,298 | B1 * | 9/2005 | Rhoads | 380/205 |
| 7,000,113 | B1 * | 2/2006 | Linnartz | 713/176 |
| 7,295,615 | B1 * | 11/2007 | Kamijo et al. | 375/240.26 |
| 7,366,908 | B2 * | 4/2008 | Tewfik | 713/176 |
| 7,421,082 | B2 * | 9/2008 | Kamiya et al. | 380/278 |
| 7,643,652 | B2 * | 1/2010 | Srinivasan | 382/100 |
| 7,676,055 | B2 * | 3/2010 | Noridomi et al. | 382/100 |
| 7,831,111 | B2 * | 11/2010 | Shah et al. | 382/305 |
| 2001/0001613 | A1 * | 5/2001 | Hashimoto | 375/240.18 |
| 2002/0176496 | A1 * | 11/2002 | Tapson | 375/240.2 |
| 2003/0095180 | A1 * | 5/2003 | Montgomery | 348/143 |
| 2004/0044894 | A1 * | 3/2004 | Lofgren et al. | 713/176 |
| 2004/0174996 | A1 * | 9/2004 | Tewfik et al. | 380/44 |
| 2004/0194126 | A1 * | 9/2004 | Kogure et al. | 725/31 |
| 2006/0075424 | A1 * | 4/2006 | Talstra et al. | 725/25 |
| 2006/0133477 | A1 * | 6/2006 | Zhang et al. | 375/240.03 |
| 2006/0227873 | A1 * | 10/2006 | Toebes et al. | 375/240.15 |
| 2007/0053458 | A1 * | 3/2007 | Taunton | 375/260 |
| 2007/0189377 | A1 * | 8/2007 | Taylor et al. | 375/240 |
| 2009/0235303 | A1 * | 9/2009 | Yamaoka et al. | 725/31 |
| 2009/0252370 | A1 * | 10/2009 | Picard et al. | 382/100 |

OTHER PUBLICATIONS

Machine translation of JP 2003-289435.*

Translation of the Notification of Reasons for Refusal (type I office action)—Japan Patent Application No. 2009-540664.

Brian Chen and Gregory W. Wornell, "Quantization Index Modulation: A Class of Provably Good Methods for Digital Watermarking and Information Embedding", IEEE Transaction on Information Theory, vol. 47, No. 4, May 2001, pp. 1423-1443.

Fernando Pérez-González, Félix Balado, and Juan R. Hernández Martín, "Performance Analysis of Existing and New Methods for Data Hiding with Known-Host Information in Additive Channels", IEEE Transactions on Signal Processing, vol. 51, No. 4, Apr. 2003, pp. 960-980.

Joachim J. Eggers, Robert Bäuml, Roman Tzschoppe, and Bernd Girod, "Scalar Costa Scheme for Information Embedding", IEEE Transactions on Signal Processing, vol. 51, No, 4, Apr. 2003, pp. 1003-1019.

Pedro Comesaña Alfaro & Fernando Pérez-González, "Side-Informed Data Hiding: Robustness and Security Analysis", Jun. 2006.

Charles Oram, Felix Collins, Nick Body, "Fully Integrated Digital Imaging in an Access Control and Security System", Security Technology, 1999 Proceedings, IEEE 33rd Annual 1999 International Carnahan Conference, Oct. 5-7, 1999, pp. 191-196.

Nobutaka Kawaguchi, Shintaro Ueda, Naohiro Obata, Hiroshi Shigeno, Ken-Ichi Okada, "An Image Authentication Scheme considering Privacy: A First Step towards Surveillance Camera Authentication", Proceedings of the 19th International Conference on Advanced Information Networking and Applications (AINA'05).

Francesco Fonda, Stefano Pastore, "Innovative Image Watermarking Tecnique for Image Authentication in Surveillance Applications", IEEE International Workshop on Imaging Systems and Techniques, May 13-14, 2005, pp. 32-35.

International Search Report for PCT/EP2007/011013.

* cited by examiner

METHOD FOR MARKING A DIGITAL IMAGE WITH A DIGITAL WATER MARK

FIELD OF THE INVENTION

The present invention relates to schemes for marking a digital document with a digital image, more particularly with a scheme for marking a digital document with a digital image for the recognition and location of alterations in digital images, where said images are obtained with a digital video surveillance system.

BACKGROUND OF THE INVENTION

In a video surveillance system a fundamental element is the camera. Currently, analogue cameras are replaced by digital security cameras. In many cases, they are designed to use the existing digital communications networks, which entails a reduction in installation costs. That factor is the cause of the rapid increase in the number of that type of digital systems.

Other common devices in digital video surveillance systems are video servers. Their main function is to digitize the analogue video signal. Another typical characteristic is that they perform the functions of interface between the analogue cameras and the digital communications networks. This makes it possible to go gradually from an analogue video surveillance system to a digital one.

Central servers are the other devices that comprise, with those presented above, the set of basic elements of a digital video surveillance system. Their essential mission is the configuration of the system and the general control of the digital cameras and the video servers. Furthermore, it is very common that the video sequences obtained are filed in them.

These new digital video surveillance systems appear as a result of the enormous progress in the information technologies in recent decades. Parallel to their appearance, there arise numerous applications for the editing of still and video images. With them, it is not complicated to manage to alter an image, so that it is not possible to distinguish between an original and a false one. Furthermore, the number of potential manipulators has enormously increased since, due to Internet, those editing tools are at the reach of a large number of users. A consequence of the above is that, from the standpoint of authenticity, the validity of the digital still images and videos are increasingly questioned.

The marking of a digital document with a digital image is one of the solutions proposed to resolve the aforementioned problem. It is a set of techniques used to insert information in a digital document (image, video, audio, etc.). The introduction of the information is performed by modifying the original document (host) with the main restriction that the distortion produced by the marking is tolerable (in accordance with the application). One of its essential advantages is that the data inserted are linked to the host, hence no additional file is needed as occurs in the case of cryptography.

Several techniques are used for the classification of a specific technique of marking a digital document with a digital image. Two of the most important are the robustness and the need or not of the host to make the information extraction possible. On this last characteristic, it is said that a technique is blind if the host is not needed for the extraction of the information and not blind in the opposite case.

In video surveillance, an essential condition is that the original images are not needed to be able to extract the information, to avoid duplicating the storage capacity required. As a consequence, it is gathered that a watermarking technique for video surveillance systems should preferably be blind.

A technique for marking a digital document with a digital image is robust if the mark inserted resists alterations, either casual or intentional. In the opposite case we find the fragile techniques, which are those wherein the mark is corrupted after the slightest alteration. Fragile or semi-fragile techniques are used for digital content manipulation recognition, as they permit demonstrating the authenticity of the content analysing the integrity of the mark.

Currently, one of the large families of techniques of marking a digital document with a digital image is that of spread spectrum, another is that formed by the digital watermarking techniques with lateral information in the coder. A particular characteristic of techniques of spread spectrum digital watermarking in blind schemes is that they undergo the interference of the host itself. In contrast, the techniques with lateral information in the coder do not suffer said interference. Since, as previously indicated, the authenticity of the images of a video surveillance system needs to be blind, the most advanced schemes use techniques with lateral information in the coder.

An example of a technique for marking a digital document with a digital image with lateral information in the coder and blind extraction can be found in the article by B. Chen and G. W. Womell: "Quantization Index Modulation: A Class of Provably Good Methods for Marking a digital document with a digital image and Information Embedding", published in IEEE Transactions on Information Theory, Vol. 47, No. 4, May 2001. This document shows the possibility of using quantizers to embed information in the host. Basically, the idea proposed is to have a set of quantizers of which one is selected depending on the message one wants to embed. The establishment of that set of quantizers is not trivial. The authors propose a practical procedure to efficiently establish them in a structured manner. Starting from a prototype quantizer, the reconstruction points are displaced, with the effect of establishing a different quantizer; this technique is called Dither modulation. On the other hand, it shows how it is possible to increase the robustness by lowering the transmission rate. One of the processes stated consists of mapping the values of the host before inserting the mark, in this way the noise that is orthogonal to the vector onto which it is mapped will not influence the communication. This document presents the technique called Distortion-Compensated (DC); hereby, it is possible to control the difference between the document marked and the original document. As a result, there is another value whereby a valid solution can be reached between the robustness of the watermark and the imperceptibility.

Another approach of the mapping in the marking of a digital document with a digital image can be found in the article by Fernando Pérez-González, Félix Balado, and Juan R. Hernández: "Performance analysis of existing and new methods for data hiding with known-host information in additive channels," published in IEEE Transactions on Signal Processing, 51(4):960-980, April 2003. Special Issue on Signal Processing for Data Hiding in Digital Media & Secure Content Delivery. In this document, the authors give a wider vision of the mapping of the host values, as they reach a solution of compromise between the insertion techniques with lateral information in the coder and the spread spectrum techniques.

Another practical implementation of the techniques based on quantizers is found in the document by Joachim J. Eggers, Robert Bäuml, Tomas Tzschoppe and Bernd Girod: "Scalar Costa Scheme for Information Embedding", published in IEEE Transactions on Signal Processing, VOL. 51, NO. 4, April 2003. This document shows a technique close to Dither modulation, but exclusively centred on scalar quantizers.

The previous articles presented have the common denominator of the theoretical approach of the watermarking schemes proposed. An example of this is to model the noisy communication channel as a channel with additive Gaussian white noise, while on many occasions the channel is characterized in that it has a quantization noise; as is the case of the coding of still images in JPEG or videos in MPEG-1.

There are several patents centred on the field of marking a digital document with a digital image for image authentication. Patent US2004131184 has the purpose of demonstrating the validity of videos to be used as irrefutable evidence in the justice system. It uses Dither-QIM watermarking techniques, introducing two types of information: one is of identity and the other control. The identity information is used to identify the video sequence, and that of control is used to determine if the image was manipulated. Another basic characteristic in this patent is that it only mentions the MPEG standard. That standard divides the coefficients of every block by a quantization matrix, therefore, there are large distortions in the information inserted at the time of compression of the group of images; as a consequence, to enter the information it is necessary to alter a large quantity of coefficients for every block. By marking a high number of coefficients, the difference between the original image and the image with the mark is, normally, quite perceptible. It is devised to be implemented in a laptop which accompanies the recording systems of police cars.

Patent EP1001604 shows a method for embedding information in images. It operates with still images coded with the JPEG or JPEG2000 standard, and an adaptation of SCS (Scalar Costa Scheme of Eggers et al.) is used to embed the information. It fixes the values of the size of the quantization steps used to embed the information, therefore reducing the versatility of the original method. Furthermore, it does not include any technique which permits embedding the information with a greater degree of robustness, such as mapping techniques.

A patent used to authenticate image flows is US2003172275, with the objective of guaranteeing copyright. It classifies the images which form in the flow as synchronous and asynchronous. In the synchronous images a mark is embedded in the blocks selected pseudo-randomly. It uses techniques of insertion with lateral information in the coder in the information introduction techniques. Due to the fact that the mark is not embedded in the whole image, it is not possible to locate the alterations.

An idea for combining the techniques of watermarking and network cameras, network camera servers or digital video servers is shown in patent US2004071311. It indicates a possible solution for integrating the cameras and the watermark embedding process from a physical standpoint. There are currently numerous manufacturers of network cameras, for which reason it is more feasible to design a method which perfectly adapts to the already existing cameras than try to design them from the start. The process to embed the watermark is characterized in that a robust watermark is inserted to be able to demonstrate the authenticity and another fragile watermark to locate the alterations. However, the patent does not disclose a method sufficiently complete so as to be able to tackle the problems typical of compression in JPEG or in any of the MPEG standards.

From the above, it is gathered that there is a need to find a practical solution for the problem of the recognition and location of spatial and/or time manipulations in still images or flows of images generated by digital video surveillance systems. Where said solution should provide a high degree of reliability and security, so that what the images show is irrefutable. Another necessary requirement, which has not yet been resolved, is the perfect adaptation of the authentication methods to the special characteristics of the existing digital video surveillance systems, such as resistance to the transcoding of JPEG to MPEG or the adaptability to the computational limitations of the devices that integrate those systems, for example: digital security cameras.

SUMMARY OF THE INVENTION

The system object of the invention makes it possible to resolve the aforementioned problem by providing a technique for marking a digital document with a digital image for the recognition and location of spatial and/or time manipulations of images for video surveillance systems. With the additional characteristic of having a high degree of reliability and security.

The system of the invention is composed of one method of insertion and another of extraction of the digital watermarks.

In the insertion method of the invention, at least two messages and the integrity information are embedded in the image. One of the messages is a time identifier which makes it possible to associate the instant wherein it was obtained to an image. Another of the messages is a unique identifier of the origin of the image. In this way, the method of extraction of the image information can determine the device which produced the image, the moment when it was taken and checking the integrity with the integrity information extracted. The origin and time reference data obtained can be checked to verify their validity.

The digital video surveillance system devices capable of taking images or generating them use, usually, the still JPEG image standard or a video standard from the MPEG family. The system stated in the invention is designed for images and videos coded with said standards; being robust to transcoding therebetween.

The minimization of the distortion introduced on inserting the digital watermark in an image is an intrinsic restriction of the invention, since it requires validating the content and not modifying it. This is achieved by adapting the methods to the noise introduced in the actual communication channel of the coding of images in the aforementioned standards. In accordance with this, the information is entered in the DCT converted domain of the image blocks, specifically in predetermined coefficients. The goal is to reduce the alteration of the predetermined coefficients and the number of coefficients necessary to embed the mark with a determined reliability. In this sense, the methods of the invention have a clear advantage, since in them the generation and insertion of the mark bear in mind the quantization noise the information introduced will undergo.

From a functional standpoint, the first part of the information insertion method of the invention is the selection of the image blocks and the coefficients of every block that are going to house every bit of every message and the integrity information. A way of efficiently resolving this and further guaranteeing that the communication is hidden is to select the image blocks with a secret key. The resolution of the recognition and location of the manipulations is strongly related to the blocks wherein the integrity information is entered; if this information in inserted throughout the image the alterations throughout it can be recognized and located.

The second part consists of mapping the values of the coefficients selected for the messages and for the integrity information onto mapping vectors, where the size of the vectors mapped, which are the vectors resulting from the mapping process, is a variable parameter of the method. To further increase privacy, the mapping vectors of the messages can be generated with a secret key. To originate the mapping vector whereon the coefficients which contain the integrity information are mapped, a function is used whose parameter is one of the messages and the secret key. One of those messages is the time reference or stamp, so that the integrity information of an image will be dependent on the time at which it is obtained. As this time dependency exists, marked images from previous instants cannot be used to falsify a video sequence, since the time stamp will not correspond to the period of time and it will recognize that attempt as forgery. The size of the mapped vectors selected makes it possible to come to a balance between the robustness of the mark and the transmission rate. Furthermore, the values that form every one of the mapping vectors, whereon the coefficients that house every bit of the messages or every piece of the integrity information are mapped, can be weighted in accordance with the values of the quantization table used to code the coefficients in the JPEG standard or some of the MPEG standards, or any other table obtained from perceptual considerations.

The third part in the insertion is the quantization of the values of the mapped vectors with a quantizer selected from a set depending on whether it is the value of the bit of the message or the piece of the integrity information that one wants to introduce. Every quantizer is produced by modifying a prototype and using a displacement vector in accordance with the value one wants to introduce. To obtain this vector, the secret key is used for the cases of the messages, and for the integrity information the secret key and the value of the messages of which it is necessary that it is dependent.

The last part of the insertion method consists of updating every coefficient of the selected image blocks, to carry the messages and the integrity information, with the result of the quantization of the mapped vectors. By marking in the values of the vectors mapped it is achieved that the noise orthogonal to every one of the mapping vectors has no influence on the communication, with the consequent increase in robustness.

The extraction method proposed in the invention makes it possible to extract the messages and determine if the image was manipulated spatially and/or in time. The method of insertion and extraction coincide in the form in which the image blocks are selected and the coefficients mapped, with the secret key. Therefore, without knowing the secret key, it is not possible to obtain the reconstructed messages.

Once the vectors have been established with the mapped values of the messages and the integrity information, the information is extracted. This is achieved by subjecting those vectors to a synchronized quantization from the key. By analysing the distances to every centroid of the result of the quantization, the reconstructed messages are obtained and the authenticity thereof is decided for every block with the integrity information. To be able to decide on the integrity of the image it is necessary to synchronize the extraction, to use the secret key and the message on which it depends as synchronization of the extraction. Normally, said message is the time reference. If the time reference does not correspond to the integrity information, the image blocks will be indicated as false. If the time reference and the mark correspond, it will be verified that the value of the time reference is within the permitted thresholds; otherwise, the method will indicate that there was a break in the sequentiality of a group of images.

With regard to the robustness level, the introduction of the messages has associated a greater robustness level than for the integrity information. This characteristic is derived from the need for the perfect decoding of the messages necessary to determine integrity of the image. Without those messages, as has been mentioned, it is impossible to synchronize them and, therefore, take a correct decision about the authenticity of the image blocks. On the other hand, the integrity information must be very sensitive to all alterations other than the distortion typical of JPEG or MPEG coding; hence, it has a low robustness.

Another object of the invention is the high reliability of the system disclosed. This is attained by achieving that the generation of the integrity information for a specific image at a specific instant and a specific device, without knowing the secret key, is a problem which cannot be tackled computationally. Furthermore, determining the secret key used to insert the information by analysing the still images or videos marked is also computationally difficult, which provides a high degree of security.

Another object of the invention is the possibility of implementing the method of insertion inside the network cameras that compose a digital video surveillance system, where those network cameras have very high restrictions in terms of the available computational resources. To be able to tackle it, the system proposed is designed to minimize the number of calculations and accesses to memory. For example, marking in the converted domain downloads to the CPU numerous cycles of instruction of the calculation of the converted. Another example is the use of the lower number of coefficients to insert the information minimizing the number of values to perform the calculation, as well as a perceptual improvement.

Another object of the system disclosed in the invention is to allow the maximum possible versatility, it being possible to configure the system so that a solution of compromise can be reached between velocity, distortion, volume of data entered and/or error rate. One of the possible configurable parameters is the number of coefficients associated to every bit of information of the messages or every piece of the integrity information. The relation between the length between the origin vector and the mapped vector is another of the possibilities. The distortion control factor is the value that most clearly makes it possible to balance the method between the distortion and the probability of recognizing an error, two conflicting characteristics in the application. Another possibility is using channel coders in the messages; in this way, its robustness is increased, lowering the error rate.

Other advantages and characteristics of the method will be apparent in the figures presented in conjunction with the description shown below.

BRIEF DESCRIPTION OF THE DRAWINGS

To complement the description being made and in order to aid towards a better understanding of the characteristics of the invention, in accordance with a preferred practical embodiment thereof, a set of drawings is attached wherein, with illustrative and non-limitative character, the following has been represented.

PREFERRED EMBODIMENT OF THE INVENTION

Figure 1:
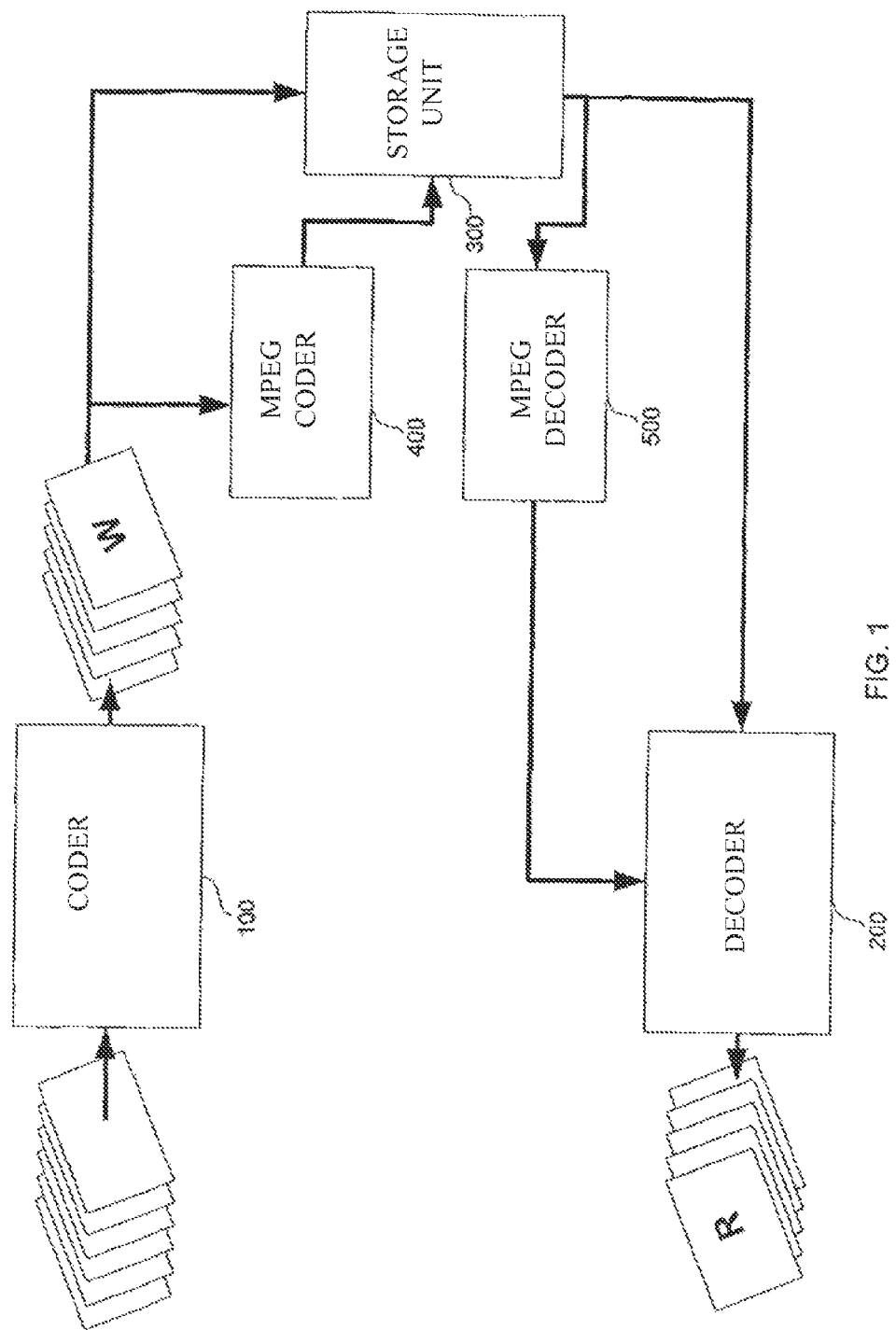
FIG. 1 schematically shows the general structure of the system which comprises the invention.

FIG. 1 schematically shows the individual elements which comprise the preferred embodiment selected for the present invention. In these elements a sequence of images, obtained by a digital video surveillance system, is subjected to techniques of marking a digital document with a digital image which make it possible to recognize and locate the spatial and/or time alterations they underwent.

After a digital camera network obtains a digital image, it is processed in a coder 100 where the digital watermark insertion method proposed in the present invention is implemented. The image marked can be saved forming part of a video with any of the MPEG standards or as an individual image coded in accordance with the JPEG standard, in both cases it is stored in a storage unit 300. If it is chosen to store a sequence of marked individual images forming a MPEG video, it is coded in a MPEG coder 400.

The verification of the integrity of the marked images starts by recovering, from the storage unit 300, the images individually filed or in the form of MPEG video. If the image flow is coded with any of the MPEG standards the image information is extracted in a MPEG decoder 500. A decoder 200, which implements the method for marking a digital document with a digital image with manipulation recognition proposed in the invention, is where it is processed in order to recognize and locate the alterations of the information obtained from the MPEG decoder 500 or from the individual images stored in the storage unit 300.

The data generated by the decoder 200 relate to the origin of the marked image, at the instant when it was taken, to the alterations recognized, etc. Furthermore, it can be configured so that it generates a result image indicating the modifications found.

Still Image and Video Standards

In the methods of inserting and extracting watermarks, the coding standards considered are JPEG for still image and the MPEG family standards for video.

One of the reasons for using the JPEG standard in the coding of still images of this practical embodiment is the good relation between the reduction in size achieved and the distortion introduced. Another of the reasons is its widespread use in current digital video surveillance systems, meaning the present invention can perfectly adapt to them.

Existing redundancy is high among the still images which compose a sequence. This factor can be used to achieve a notable reduction in size, thereby achieving that their storage is more efficient. In the methods proposed in the present invention, for the coding of a sequence of images, a member of the MPEG standard family is used. This is due to the numerous coincident points among the MPEG standards and the JPEG standard, allowing the methods proposed to easily adapt to both.

The JPEG standard uses as colour space three components $YC_bC_r$. The components are luminance (Y) and that of colour ($C_b$ and $C_r$). Every component of the image is divided into blocks, non-overlapping, of 8⌊8 samples. JPEG uses a coordinate change in order for the greater part of the energy to be concentrated in a smaller number of dimensions than the original representation (RGB), a fact which is used to reduce the image size. Specifically, JPEG uses discrete cosine transform (DCT) in every block of the image of components Y, $C_b$ or $C_r$. Every converted block $B_i$ of the image is subject to the quantization of 64 coefficients $c_j$ which form it, dividing them into elements $q_j$ which constitute a JPEG quantization matrix $Q_{JPEG}$ of dimensions 8⌊8, establishing as result quantized coefficient $c_{quant,j}$, as shown by $$c_{quant,j} = \text{round}(c_j/q_j),$$

where, in the previous expression, round( ) denotes a function which returns the nearest whole value. One of the quantized coefficients $c_{quant,j}$, of the blocks $B_i$ has an entropic coding without losses applied to generate the JPEG file with the image, where the coding is especially designed to efficiently house those $c_{quant,j}$ whose value is zero.

To recover the reconstructed converted blocks $\hat{B}_i$ which form the image, it is necessary to perform the inverse process to quantization. Every quantized coefficient $c_{quant,j}$ belonging to every $\hat{B}_i$ should be multiplied by its respective element $q_j$ of $Q_{JPEG}$, i.e., $$\hat{c} = c_{quant,j} \cdot q_j.$$

From the way in which an image is coded and decoded in the JPEG standard, it is gathered that the greater the values of the quantization matrix JPEG $Q_{JPEG}$ the distortion introduced will be greater, although the compression will also be greater. The energy of the image is concentrated in the lowest frequencies of the converted blocks of the image and, on the other hand, the human visual system is more sensitive to those frequencies; therefore, in the generation of $Q_{JPEG}$ these characteristics should be borne in mind to achieve a good JPEG coding, assigning the sizes of the quantization steps smaller than the smallest frequencies. Often, the result of applying $Q_{JPEG}$ fulfilling those considerations is that numerous $c_{quant,j}$ of the highest frequencies are zero and, as previously mentioned, a considerable reduction in size is achieved.

Figure 10:
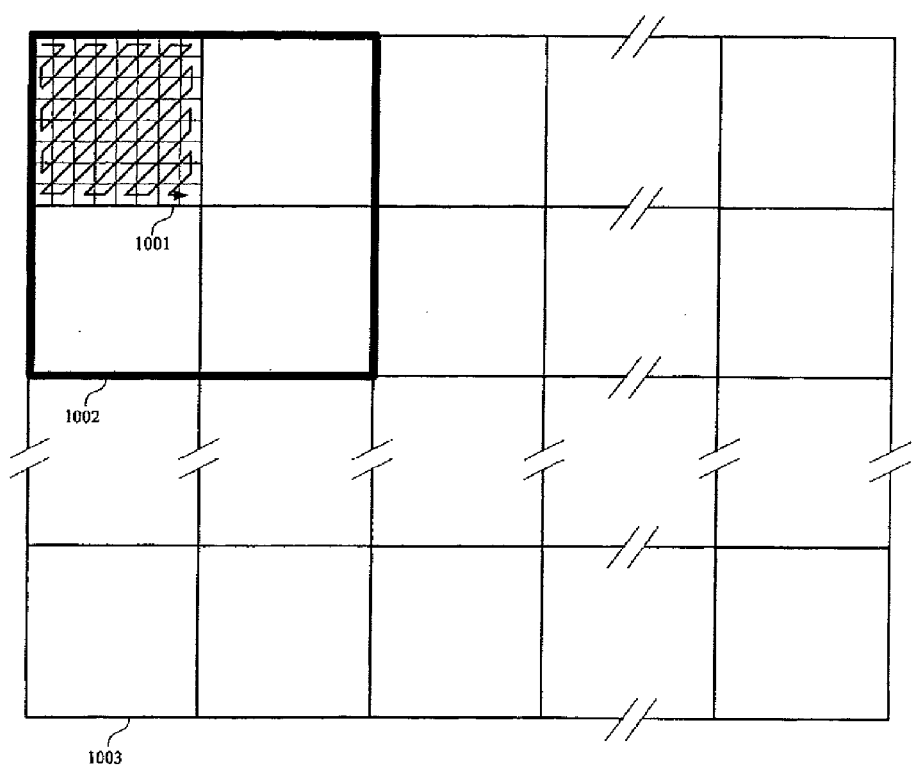
FIG. 10 shows the division of an image in blocks and in macroblocks, it further represents the ordering of the coefficients according to the order in zigzag.

FIG. 10 shows the division of the images 1003 in the JPEG standard forming blocks of 8⌊8 pixels 1001. Furthermore, it is possible to observe the zigzag ordering of the coefficients which form the blocks, represented by an arrow which starts in the coefficient in position (1,1) (continuous coefficient) and ends at coefficient (8,8).

The present description of the preferred embodiment states that the JPEG images which form a flow of images obtained by a video surveillance system are compressed with the MPEG-1 standard. An MPEG-1 video sequence comprises several types of images, the types being I, B and P. According to this characteristic, the images containing the mark are codes type I and P, leaving the codes as type B without mark for which reason they can withstand a greater compression.

When a sequence of individual still images is coded as an MPEG-1 flow, a coding template is used. By way of illustration, we will consider template IBBBBPBBBB. That template indicates that the first image is coded as a type I image, the four following type B, then type P and the last four type B. The methods of marking a digital document with a digital image proposed do not use the coded images marked as B. If we want to increase the degree of compression of a video of marked images the proportion of images coded as type B should be increased. As a consequence, the number of I and P images of the flow decrease and, with this, the capacity of recognition of alterations. Using the aforementioned template, if a digital camera network generates marked images with a rate of 10 per second and they are coded in the MPEG coder 400, only alterations with a resolution of 0.2 s can be recognized. In accordance with this, it is necessary at the time wherein the user of the system configure the MPEG-1 coding, to come to a compromise between the compression degree and the time resolution of the alterations.

Image-linked Information

In the present preferred embodiment of the invention the inserted mark is composed of a metadata message with a time reference and the integrity information.

In the metadata message, it is possible to insert and extract the arbitrary information desired from the image. By way of illustrative and non-limitative example, a unique identifier is used of the element generating video surveillance images. Due to the typical context wherein a digital video surveillance system is found, the IP address is selected in the present practical embodiment. Note that there exist numerous alternatives as unique identifier, such as: serial number, MAC (Media Access Control), etc.

The information is entered in the digital image in the converted coefficients of the luminance blocks which form the image. The blocks wherein the integrity information are entered are grouped in macroblocks. The dimensions of the macroblocks for the insertion of the integrity information are configurable and, furthermore, determine the granularity of the recognition of the spatial alterations. The greater the macroblock, the more difficult it is to indicate the specific points of the image that were modified, although this option has the advantage of the possibility of using a greater number of coefficients to determine their authenticity. For example, a macroblock of the integrity information can be formed by 2⌊2 blocks. FIG. 10 represents a macroblock 1002 used in the recognition of spatial alterations.

Coder Modules

Figure 2:
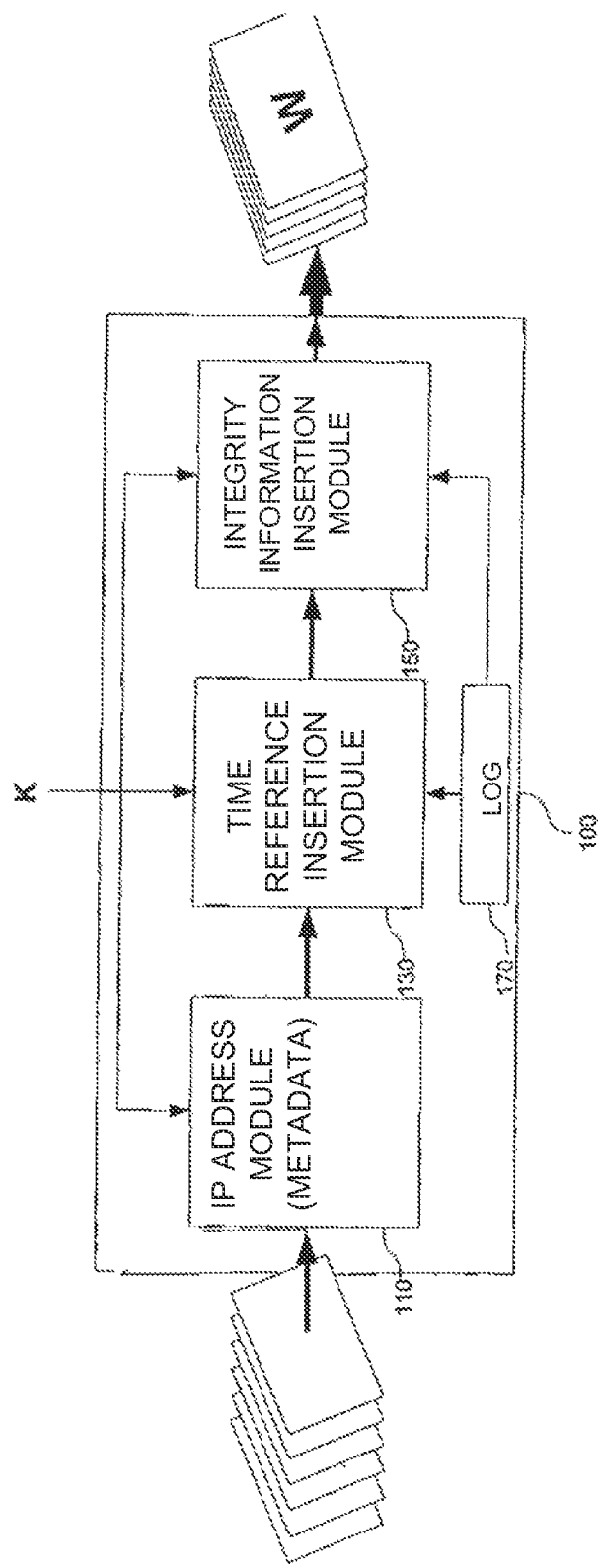
FIG. 2 shows in a scheme the modules into which the insertion method is divided.

FIG. 2 shows the internal scheme of the coder 100, which consists of an IP address module (metadata) 110, a time reference insertion module 130, an integrity information insertion module 150 and a log with the value of the time reference 170.

When an image coded with the JPEG standard is introduced in the coder 100, it is processed in the IP address insertion module 110 to introduce in every image the IP address of the device of the digital video surveillance system that obtained it. Then, the image is passed to the time reference insertion module 130 to introduce the time reference in the image (stored in the log 170); with that information, it is possible to know the instant wherein the image was obtained and, furthermore, determine if the order of a sequence of images was altered (time alterations). Every image in the exit of the module 130 passes to the integrity information insertion module 150; in that module the integrity information whereby the spatial alterations can be recognized is inserted. In the insertion of the integrity information, the time reference of the log 170 is used, for which reason it is not possible to falsify one image using another, since the integrity information is not valid at any time other than that at which it was generated. The modules 110, 130 and 150 use a secret key K, so that introducing those two messages or the integrity information without said key is a very computationally complicated problem.

Decoder Modules

Figure 3:
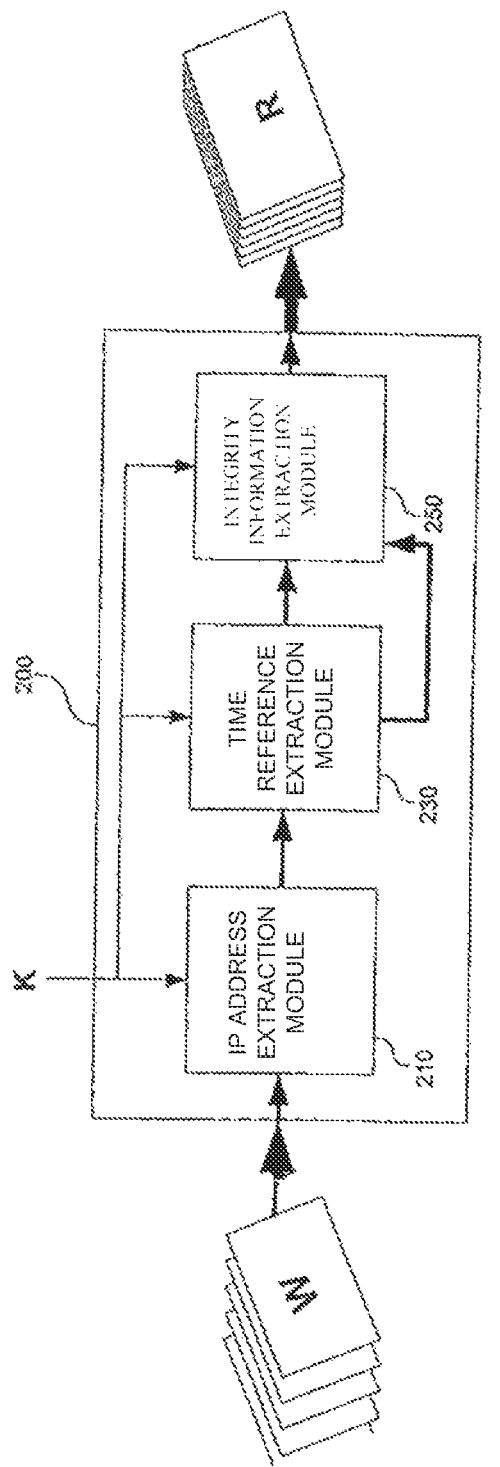
FIG. 3 shows in a scheme the modules into which the extraction method is divided.

FIG. 3 shows the internal decoder 200 scheme, formed by an IP address extraction module 210, a time reference extraction module 230 and an integrity information extraction module 250.

The IP address extraction module 210 recovers the IP address inserted in the image. The time reference extraction module 230 recovers the time reference connected to the image. The integrity information extraction module 250 recovers the integrity information and determines if an image was spatially manipulated, i.e. if any square of the original image was modified. If the image was manipulated, the integrity information extraction module 250 can generate an image graphically indicating the position of the alterations recognized. The extraction modules 210, 230 and 250 use the same secret key K to extract the information as that used for entering the information.

Internal Ordering of the Coder and the Decoder

Although the internal schemes of the coder 100 and of the decoder 200 of FIG. 2 and FIG. 3 show a cascade connection between the modules, this characteristic is not restrictive. It is possible to arrange the modules in parallel or even group them in a single module.

Coder

Figure 4:
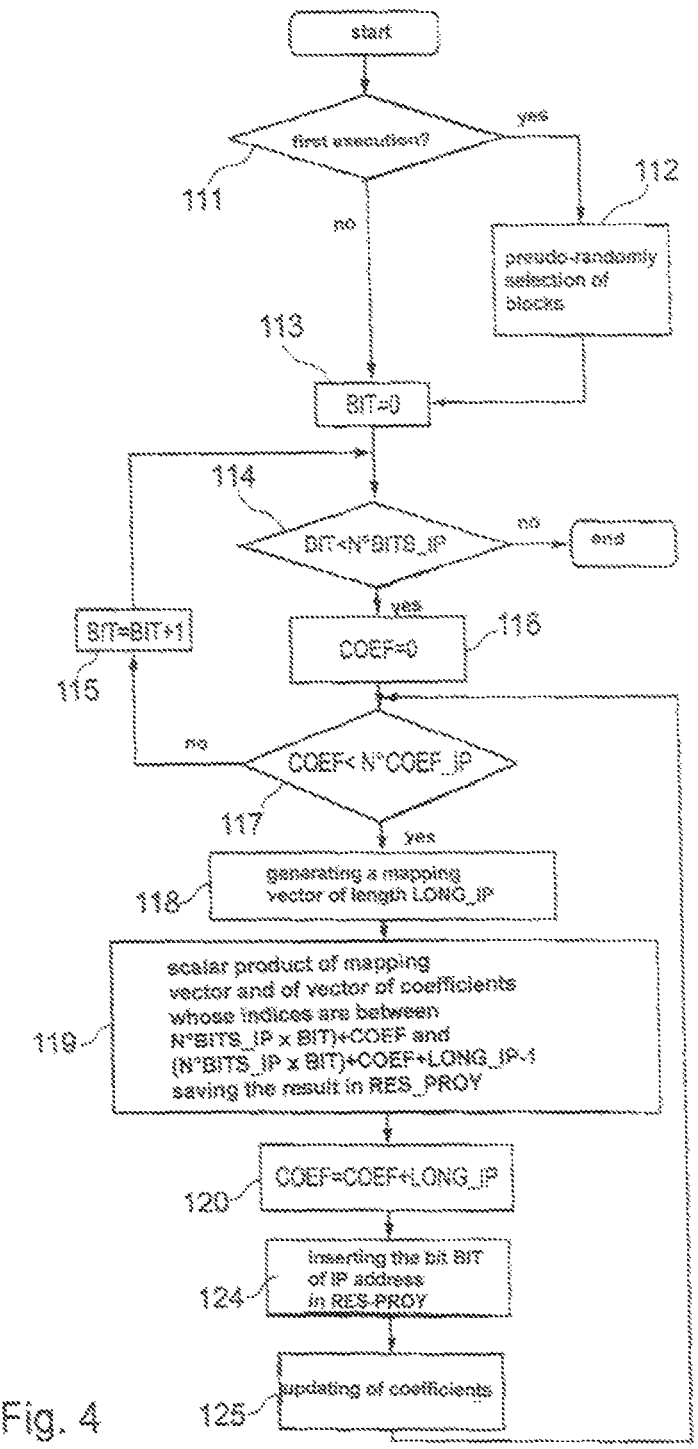
FIG. 4 represents a flow chart of the process of introduction of a message with the IP address in an image.
Figure 5:
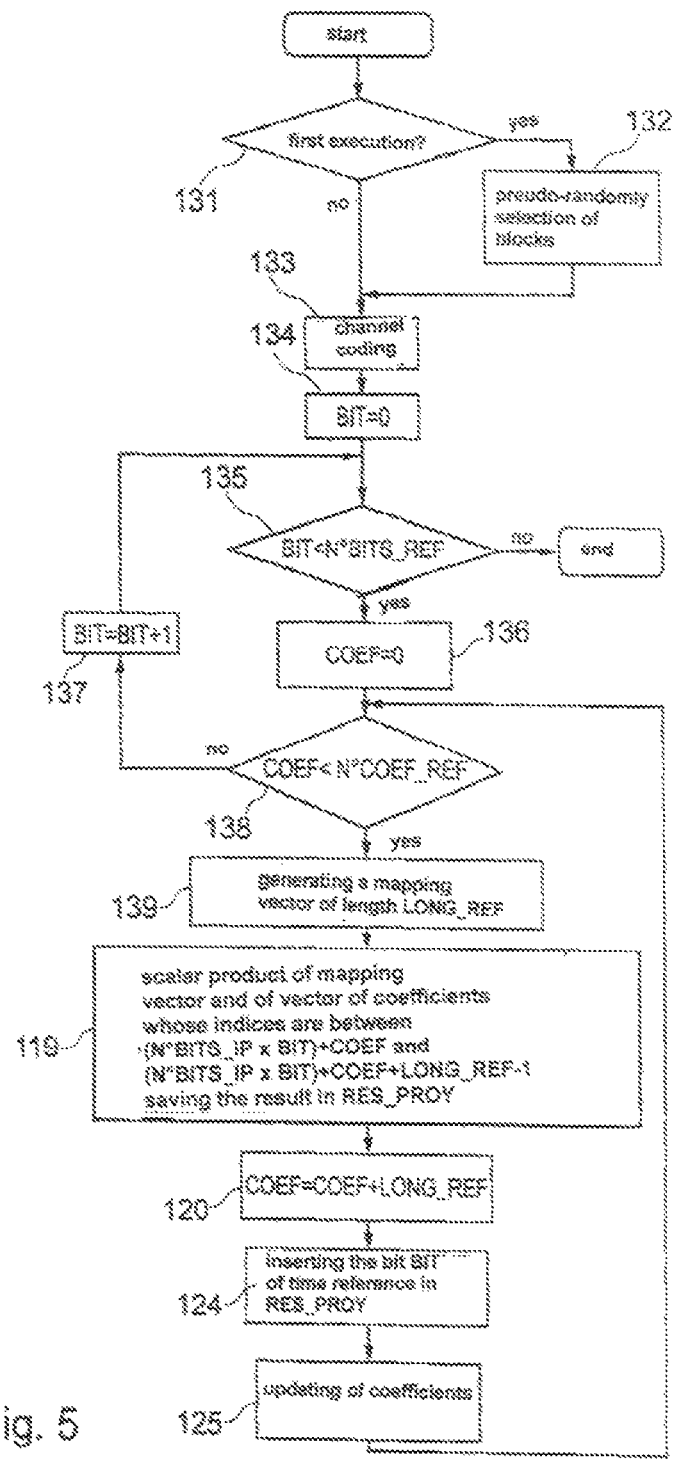
FIG. 5 represents a flow chart of the process of introduction of a message with a time reference in an image.
Figure 6:
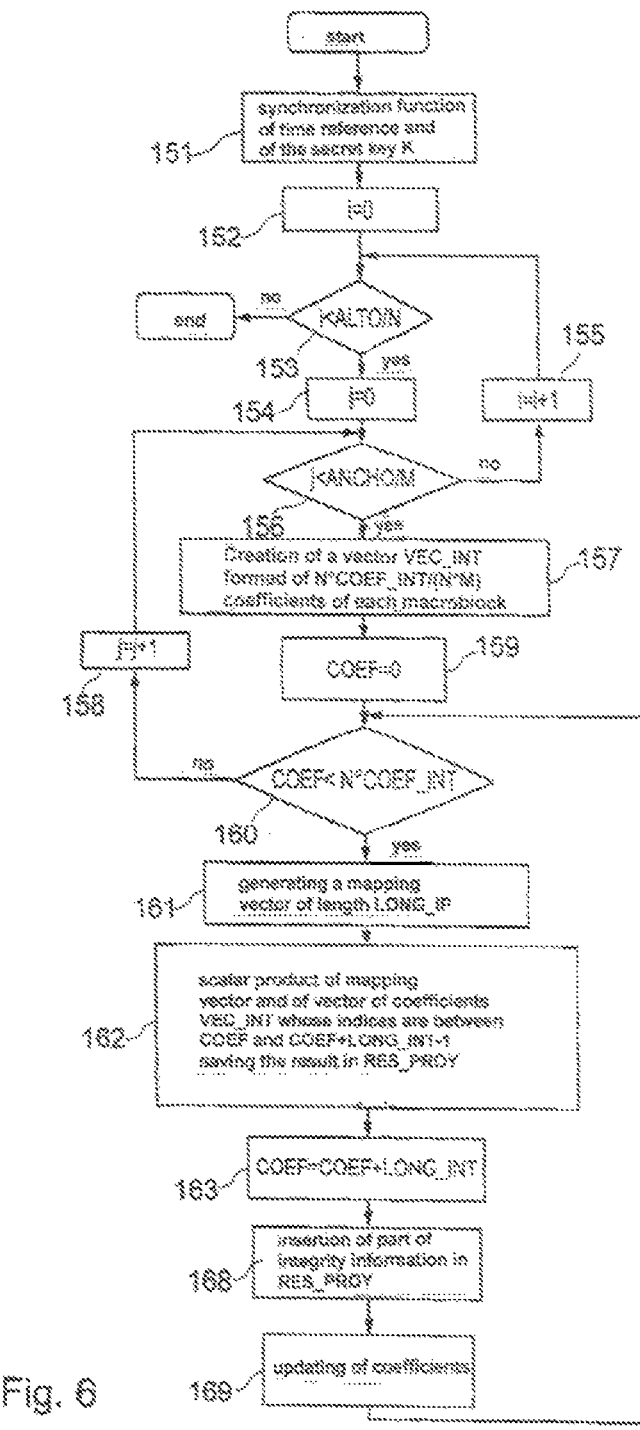
FIG. 6 represents a flow chart of the process of introduction of the integrity information in an image.

FIG. 4, FIG. 5 and FIG. 6 represent the flow chart of the methods of the modules of insertion which form the coder 100, which can be observed in FIG. 2.

The flow charts can be configured by assigning values to determined parameters of the method. One of the parameters of the method is the number of coefficients of the image per bit of information used in the case of the messages or the number of coefficients of every macroblock for the introduction of the integrity information. In the charts they are represented by N°COEF_IP, N°COEF_REF or N°COEF_INT, for the case of the message with IP address, the message with the time reference and the integrity information respectively. Another parameter of the message introduction charts is the number of bits of information of every message, which in the charts are represented by N°BITS_IP and N°BITS_REF, in the case of the IP address and the time reference respectively. Another possible way of configuring the method is by the selection of the block coefficients which will be used to insert the message with the IP address (metadata), the message with the time reference and the integrity information. The size of the mapping vectors whereon the values of the coefficients are mapped, of which the mapped values wherein the information is inserted are obtained, is another configurable value, being represented by LONG_IP, LONG_REF and LONG_INT for the IP address, the time reference and the integrity information, respectively.

FIG. 4 shows the flow chart of the IP address insertion module (metadata) 110, wherein every image obtained by a video surveillance system will be processed. If it is the first time that the method is executed (step 111) in an image flow, the converted blocks of 8⌊8 coefficients wherein the image is divided are selected pseudo-randomly (depending on the secret key K) in step 112 to use them in the IP address insertion. In step 113, the BIT variable is initialized, used for determining the number of bits of the message of the IP address which have been introduced in the image. In step 114, it is decided if all the bits of this message have already been introduced in the image; if the answer is affirmative, the part of insertion of the IP address in the image will have concluded. Otherwise, it continues in step 116 wherein the coefficient counter is initialized by COEF bit to zero. Step 117 determines if the value of the BIT bit has already been entered in the N°COEF_IP coefficients that it had assigned, if affirmative, it will go on to step 115 which will add one to the value of the BIT counter and will go back to aforementioned step 114. If the coefficients of the image associated to that bit of the IP address have not yet been altered it will go on to step 118, where a mapping vector is generated pseudo-randomly (in accordance with the secret key K) of length LONG_IP. After obtaining the mapping vector it continues in step 119, where the scalar product is calculated between the mapping vector and the vector formed by the selected coefficients (in step 112) whose indices are between (N°BITS_IP×BIT)+COEF and (N°BITS_IP×BIT)+COEF+LONG_IP-1, saving the result of the mapping in RES_PROY. In step 120, LONG_IP is added to the COEF value, which will be used to determine the coefficients used in the calculation of the following mapping. In step 124, the value of the BIT bit of the IP address in RES_PROY is added and, in step 125, the coefficients with which the current mapping was calculated are updated with the result obtained in the previous step (124).

FIG. 5 shows the flow chart of the time reference insertion module 130. As in FIG. 4, a digital image obtained from the video surveillance system is inserted at the start. In step 131, it is determined if it is the first time that the method is executed for that determined data flow. If this is the case, we go on to step 132 which will select pseudo-randomly (in accordance with the secret key K) the blocks of the image which are going to house the message with the time reference. In step 133, the message with the time reference is subjected to a channel coding, whose objective is to increase its robustness producing a coding time reference message. In step 134, it initializes to zero with the BIT variable used to control the number of bits of the coded time reference message which have been inserted in the image. In step 135, it is verified if the coded time reference message has been totally inserted in the image; to do this, it is verified if the BIT value is less than the number of total bits assigned for the insertion of the message coded with the time reference N°BITS_REF. If this condition is not complied with, the work of the time reference insertion module 130 will have finished. If there are still bits of the time reference to be introduced it continues in step 136, which initializes the COEF value to zero. The COEF variable is used to control the number of coefficients which have been introduced from the BIT bit of the coded time reference message. In step 138, it is verified if the N°COEF_REF coefficients assigned to house every bit of the time reference have been computed, if this is the case. If they have already been completed, it continues in step 137 which updates the BIT value adding one to it, indicating that it will then proceed with the insertion of the following bit of the coded time reference message. If all the coefficients corresponding to every bit of the time reference have not yet been used, it progresses from step 138 to 139. In step 139, it generates a mapping vector of length LONG_REF, obtained pseudo-randomly with the secret key. This mapping vector will be that used to map the values of the following LONG_REF coefficients. In step 140, the scalar product between the mapping vector (obtained in step 139) and a vector formed by the coefficients selected in step 132, whose indices are found between (N°BITS_REF×BIT)+COEF and (N°BITS_REF×BIT)+COEF+LONG_REF-1, are calculated, storing the result of the mapping in RES_PROY. In step 144, the value of COEF is added to the value of LONG_REF. Then, it goes on to step 145, wherein the bit of the coded time reference message, whose index is BIT, is inserted in the mapped value RES_PROY. In step 146, the coefficients which were used to compute the current mapping are updated with the value of RES_PROY, resulting from step 145.

Figure 7:
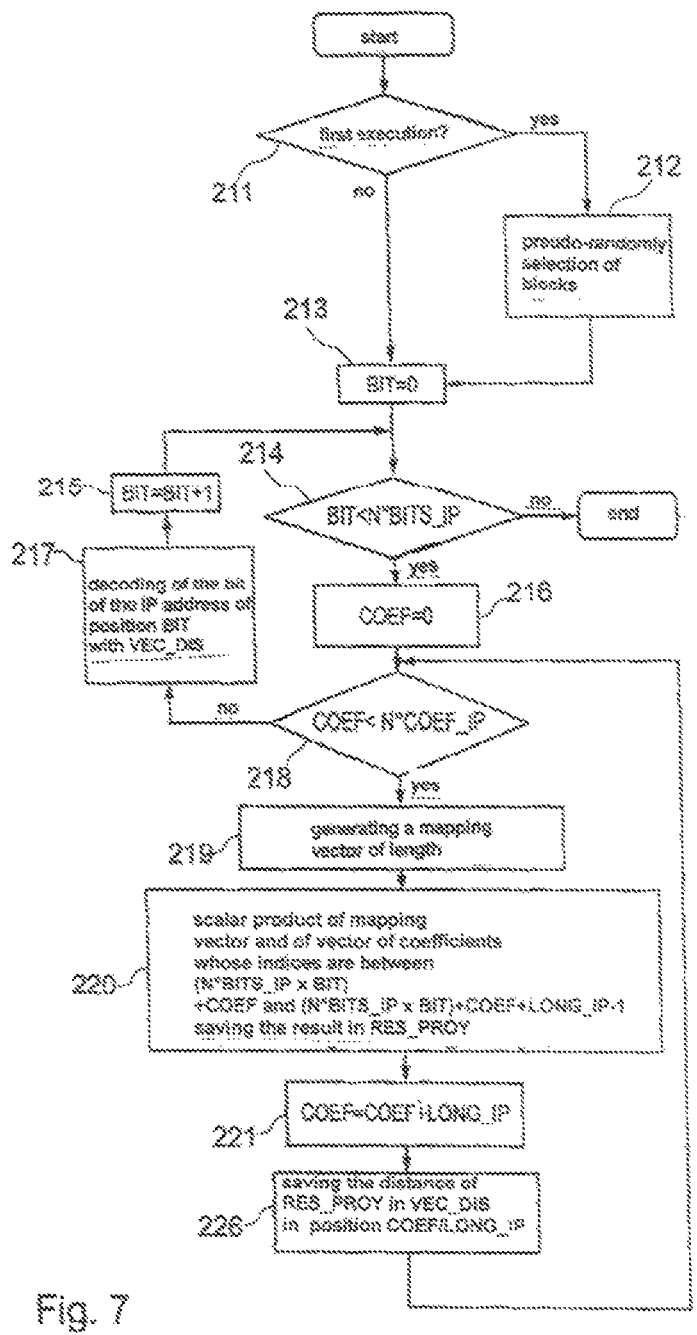
FIG. 7 represents a flow chart of the process of extraction of a message with an IP address of an image.
Figure 8:
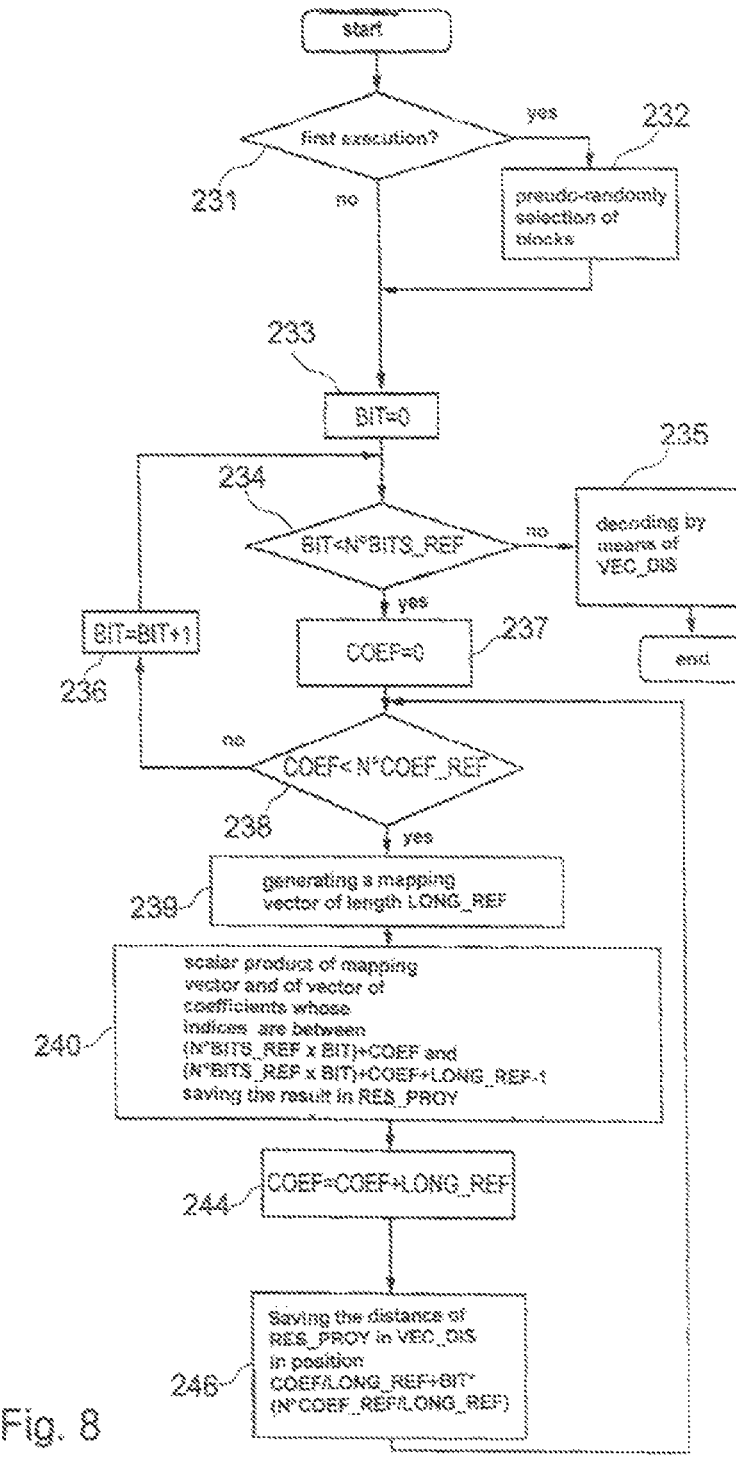
FIG. 8 represents a flow chart of the process of extraction of a message with a time reference of an image.
Figure 9:
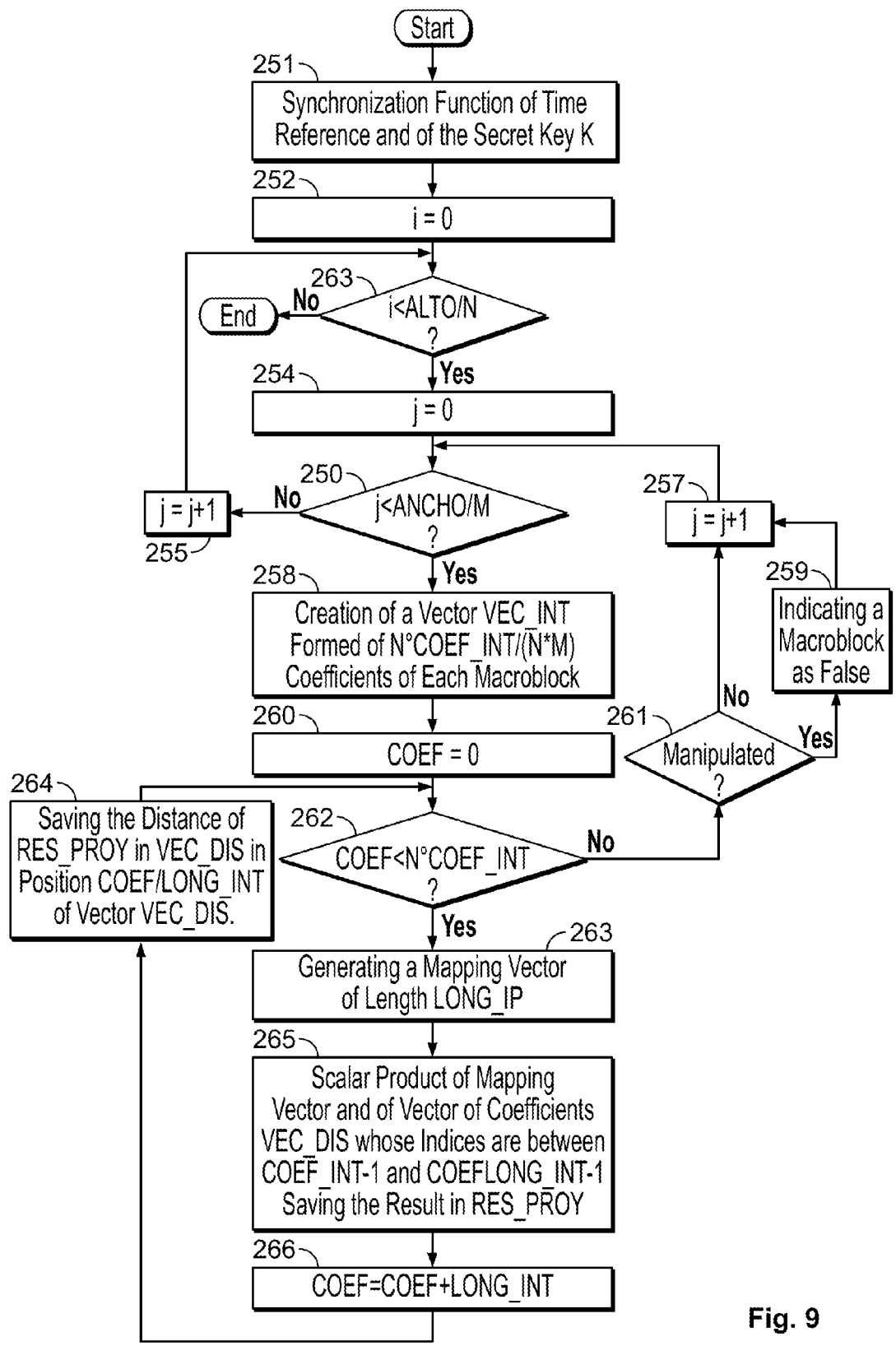
FIG. 9 represents a flow chart of the process of verification of integrity of an image.
Figure 11:
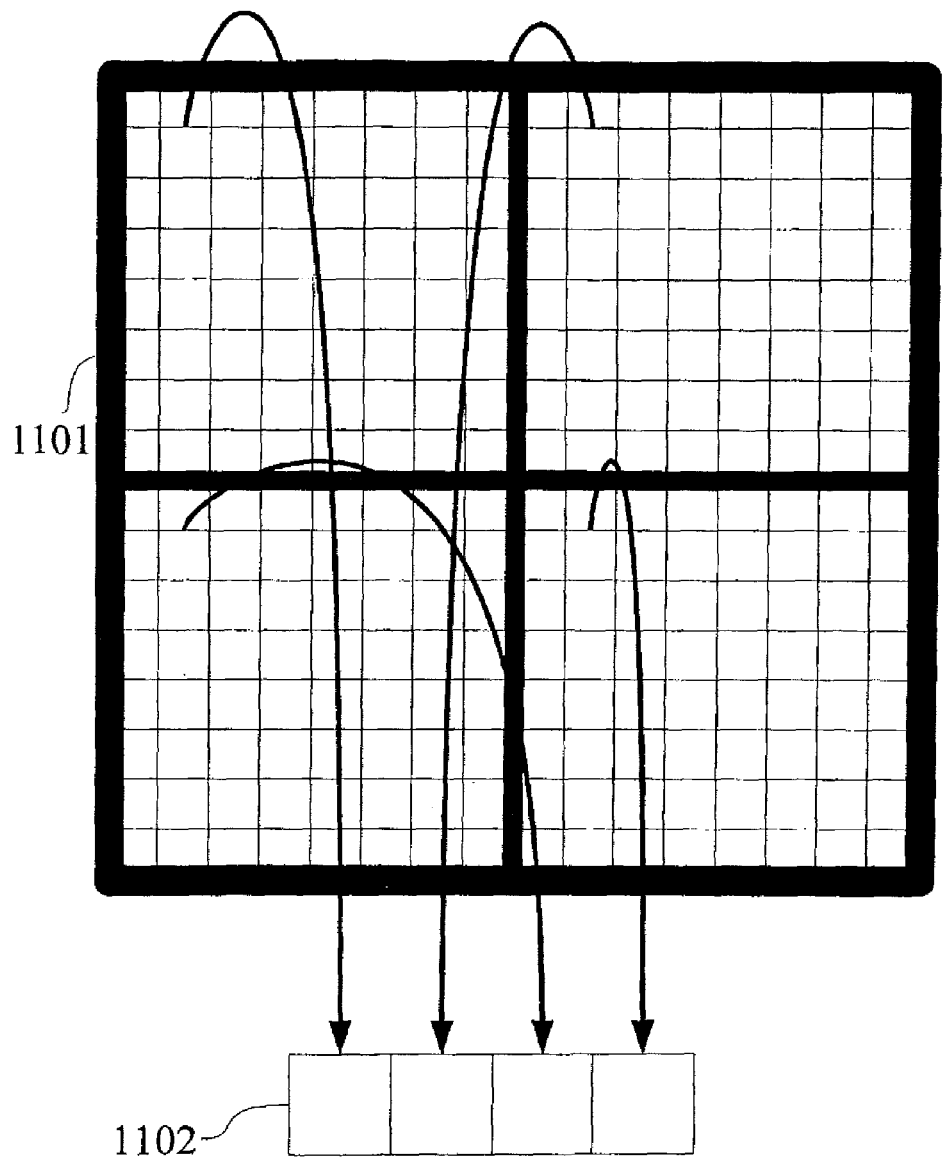
FIG. 11 represents the selection and ordering of the coefficients of the blocks which form an integrity macroblock.

FIG. 6 shows the flow chart corresponding to the integrity information insertion module 150. To this method is passed as parameter the value of the time reference which is introduced in the image by the time reference insertion module 130 obtained from the log 170 and the secret key K. In step 151, the method is synchronized to achieve that the introduction of the integrity information in the image is dependent on the instant at which the image which is being processed was taken, furthermore it uses the secret key K in the synchronization to guarantee that only the authorized users can enter the valid integrity information. If the time reference is not known, the process of entering the integrity information without it being recognized in the decoder 200 of FIG. 1 is very complex. In step 152, the index value i is initialized, whose function is that of counting the macroblock row of the insertion method during its execution. In this figure, the width in blocks (8⌊8) of the image is denoted by ANCHO and the height in blocks by ALTO, the width in blocks of every macroblock M and the height in blocks of every macroblock N. In step 153, it is verified if the integrity information has already been introduced in the whole image, if this has been the case, the insertion process of the integrity information is concluded. If the whole image has not yet been computed, it advances to step 154 wherein it initializes to zero the value of the index of the macroblock columns j. In step 156, it verifies if all the macroblock columns of the current row of macroblocks, row i, has been computed. If they have already been computed it goes on to step 155 which adds a unit to the index to process the following row of macroblocks or finish, deciding this in step 153. If the result of the decision taken in step 156 is that there remain macroblocks from row i to process it continues in step 157, where a VEC_INT vector is created of length N°COEF_INT, taking from every block, which forms the macroblock of coordinates (i,j) of the image, N°COEF_INT coefficients. The order of arrangement of the coefficients of every block in said VEC_INT vector is of left-right and of up-down with respect to the position of the blocks in the current macroblock, as represented in FIG. 11. The order of arrangement of the coefficients belonging to every block in the VEC_INT vector follows the order of the coefficients according to the zigzag order of those coefficients in the block. In the following step, 159, the COEF value is initialized at zero. Then, in step 160 it verifies if the integrity information has already been inserted in the current macroblock (i,j), if affirmative it adds a unit to j in step 158 and it continues in step 156. If it decides (step 160) that there are still unmarked blocks (COEF<N°COEF_INT) it continues with step 161. In step 161, it generates pseudo-randomly from the time reference and the secret key a mapping vector of length LONG_INT, where the generation of this vector is the result of the synchronization carried out in step 151 of FIG. 6. In step 162, the mapping is computed, for this it calculates the scalar product between the mapping vector (obtained in step 161) and a vector formed by the coefficients of VEC_INT with indices between COEF and COEF+LONG_INT-1, where the result of this mapping is saved in RES_PROY. In step 163, the value LONG_INT is added to the value of COEF. Then, it continues in step 168. In it is inserted the value of that part of the integrity information in the value RES_PROY, which is the result of the mapping of the coefficients of the image onto the mapping vector. In step 169, the coefficients used to calculate the current mapping are updated with the RES_PROY marked value, resulting from step 168. Decoder FIG. 7, FIG. 8 and FIG. 9 represent the flow charts of the processes which are performed in the extraction modules which form the decoder 200 and which can be observed in FIG. 3. The values of the parameters used in the coder 100 must be the same as those used in the decoder 200. For example. N°COEF_IP, ANCHO, M, N°BITS_REF, etc.

FIG. 7 shows the flow chart of the method of extraction of the IP address corresponding to the IP address extraction module (metadata) 210. At the start we have a digital image wherefrom the module 210 extracts the IP address. In the first step (211), it is verified if it is the first time that the flow chart is executed in the sequence whereto the image that is going to be processed belongs. If affirmative, it continues in step 212 wherein are selected pseudo-randomly with the secret key K the blocks of the JPEG image from which the message with the IP address are extracted. The following step is 213, wherein the BIT value is initialized to zero. That value permits controlling the number of bits of the address wherefrom they are extracted. It is in step 214 where it is verified if the total bits of the message with the IP address were recovered; if this is the case, the extraction of the IP address of the current image which is processed in this module is finalized. If the total of the bits which form the IP address N°BITS_IP has not finished it is continued in step 216, where it initializes the value COEF to zero. The value COEF is a counter of the number of coefficients which have been used to recover the value of the BIT bit of the IP address. The decision on whether the total of N°COEF_IP coefficients necessary to extract the value of a bit of the IP address are already used is taken in step 218. If it has already been finished, it continues with step 217, wherein the value of the BIT bit of the IP address is decided using a VEC_DIS vector of length N°COEF_IP/LONG_IP formed by the values stored in step 226. In step 215, the value of the BIT variable is updated to go ahead with or finish the extraction of the IP address, which is decided in step 214. We come to step 219 if the decision taken in 218 is that there still remain groups of coefficients to process to be able to calculate the value of the BIT bit of the IP address. In step 219, a mapping vector is generated of length LONG_IP, where that vector must be equal to that generated in 118 of FIG. 4, to do it, it must know the value of secret key K. In step 220, the mapping is computed by the scalar product between the mapping vector and a vector formed by the coefficients (selected in step 212) whose indices are found between (N°BITS_IP× BIT)+COEF and (N°BITS_IP×BIT)+COEF+LONG_IP-1, to finally store the value in RES_PROY. In step 221, the value LONG_IP is added to COEF. In step 226, the result of the calculation of the distance between RES_PROY and a reference vector is saved in position COEF/LONG_IP of the vector VEC_DIS. This last calculation will be explained later on in this description of the preferred embodiment in detail.

FIG. 8 shows the flow chart of the time reference extraction module 230. As in the previous flow charts described, at the start is found a digital image wherefrom one wants to extract the time reference it has linked. The first step (231) of the chart determines if it is the first time that it is extracted from the image of the present flow of images, if this is the case, it goes on to step 232, and otherwise to step 233. In step 232, the blocks of the coded image which are going to be used to extract the time reference are selected pseudo-randomly with the secret key K. Step 233 initializes the BIT value to zero; with that value it is possible to know when the process of extraction of the time reference in the image has concluded. In step 234, it is decided if all the bits of the time reference message in the image have been extracted, continuing in step 237. Step 235 is composed of a channel decoder which obtains the value of the time reference message processing the values of the vector VEC_DIS, the process being the reverse of step 133 of FIG. 5. After the channel decoding, we come to the end of the process described by the flow chart. In step 237, the zero value is entered in COEF, which is used as counter of the number of the coefficients used at a determined instant to extract the metrics corresponding to the BIT bit of the coded message of the time reference. In step 238, it is decided if all the coefficients used to extract the metrics corresponding to a bit of the coded message of the time reference have been computed. If all the coefficients associated to a determined BIT bit have already been computed, it goes ahead with the sum of one unit to the BIT value to calculate the RES_PROY values of the following bit of the message, if it exists. If not all the coefficients necessary to extract the information inserted in the image relative to the bit have been processed, it continues in step 239. In step 239, a mapping vector of length LONG_REF is generated whereon the values of coefficients will be mapped. In step 240, the scalar product is calculated between the mapping vector and a vector formed by the coefficients selected to insert the time reference (selected in step 232) whose indices are found between (N°BITS_REF×BIT)+COEF and (N°BITS_REF× BIT)+COEF+LONG_REF-1, the value obtained is stored in RES_PROY. In step 244, the value of COEF is updated, adding LONG_REF to it. In step 246, the value RES_PROY is taken and its distance is calculated with respect to a reference vector, whose result is stored in a VEC_DIS vector in the position COEF/LONG_REF+BIT×(N°COEF_REF/LONG_REF), where VEC_DIS will be used in step 235 to determine the time reference message, as previously indicated. The way to calculate the distance of RES_PROY will be tackled later in the description.

FIG. 9 shows the flow chart corresponding to the integrity information extraction module 250. This method has as parameter the time reference extracted in the module 230 and the secret key K; without the correct value of the time reference, it would not be possible to recover the integrity information and it would indicate the image as false, as the time reference does not correspond to that it has linked with the integrity information. The flow chart has as intake an image wherefrom the integrity information will be extracted and check its authenticity spatially. In step 251, the method is synchronized with the time reference and the secret key K, which will allow correctly generating the pseudo-random values necessary for the present extraction process. In step 252, the index i is initialized to the zero value which will be used by the method to know in what row of macroblocks it is found. In step 253, it is determined if the extraction of the integrity information has reached its end, knowing this on verifying if all the rows of macroblocks have already been computed. If all the rows have not yet been computed, we go ahead with step 254, wherein the value j is initialized which permits controlling the number of columns of macroblocks of a row of macroblocks I which have been computed. In step 254, it is decided if all the columns of macroblocks which form every row have been extracted. If that is the case, a unit is added to the counter i in step 255 and we go back to step 253. If all the columns have not yet been calculated we go to step 258 wherein the coefficient vector of the macroblock with coordinates (i,j) used to extract the integrity information is generated. The way of generating the vector is the same as that shown above in step 157 of FIG. 6. In step 260, the value COEF is initialized to zero, which permits controlling the number of coefficients used to extract the information for every macroblock. The decision on whether all the coefficients of a macroblock have already been computed is taken in step 261 wherein the distance vector VEC_DIST is analysed and it is decided if the macroblock was manipulated; if this the case, it continues in step 259. The function of step 259 is to indicate a macroblock as false; this can be done by indicating the macroblock in some visible form and/or emitting a signal which allows a user to know that the macroblock has been altered. If, in step 261, it is not decided that the block studied has been manipulated, it goes ahead, as with the continuation of step 259, with step 257. In step 257, a unit is added to the counter j, indicating that the extraction of the integrity information from a macroblock has finished. On the other hand, if in step 262 it is decided that the integrity information corresponding to the macroblock has not yet been recovered, it continues in step 263. In step 263, a mapping vector is generated of length LONG_INT synchronized with the generator in 161 in FIG. 6. Its generation is dependent on the time reference and the key, hence if the time reference or the secret key is not known it will determine with high probability that the macroblock is false. In step 265, the scalar product is performed between the mapping vector and a vector formed by coefficients of VEC_INT with indices between COEF and COEF+LONG_INT-1, where the result of the mapping is stored in RES_PROY. In step 266, the value COEF is updated adding the value LONG_INT to it. After the current mapping has concluded, it continues with step 264. In that step the value resulting from computing the distance between RES_PROY and a reference vector in the position resulting from the division COEF/LONG_INT of the distances vector VEC_DIST is entered. The explanation of the calculation of the distance will be tackled later in the description.

Pseudo-random Selection of Blocks

In the present practical embodiment, the DCT converted blocks which house the messages of a still digital image coded in accordance with the JPEG standard are selected pseudo-randomly. It is carried out in the pairs of steps 112 (FIG. 4)-212 (FIG. 7) and 132 (FIG. 5)-232 (FIG. 8) for the message with the IP address and the message with the time reference, respectively. If the blocks selected in coding and decoding are not the same, the data recovered are invalid.

The selection is performed exchanging the blocks which form the image using a generator of pseudo-random numbers, wherein the value of the secret key or a function of it is used as seed. The converted blocks of the image are arranged forming a block vector according to the order of left-right and up-down with respect to the position of the blocks in the image. With the pseudo-random generator the position of every block in the block vector is exchanged establishing a disordered block vector.

The coefficients of the blocks which form the disordered block vector are fixed for every one of the messages which are going to be hidden in the image. The coefficients associated to every message are disposed forming a coefficient vector c. The coefficient vector of the message with the IP address is denoted by $c_{IP}$ and has a length of N°BITS_IP×N°COEF_IP. The message with the time reference is denoted by $c_{REF}$ with a length of N°BITS_REF×N°COEF_REF.

If the mapping vectors or matrices are not orthogonal, it is necessary that the sets of coefficients associated to every message are disjointed. If this is not complied with, the insertion processes of every message would be mutually interfering and the information inserted could not be recovered.

The pseudo-random selection of the blocks can be performed when every image is going to be processed and not only at the start of a flow of images. This possibility has the drawback that the execution time of the insertion or the extraction increases, for which reason this solution is not advisable in those cases where there are time restrictions.

Synchronization Depending on the Time Reference and the Secret Key

The synchronization of the introduction and the extraction of the integrity information is performed in steps 151 (FIG. 6) and 251 (FIG. 9). The secret key K is used to guarantee that the integrity information is entered by an authorized user of the system. The synchronization with the time stamp is implemented with the objective of creating a dependency between the process of insertion of the integrity information and the value of the time reference. As a result, it is not possible to use marked images at a previous time instant to falsify an image obtained at a different instant without it being recognized. This synchronization is achieved by initializing a pseudorandom integrity generator with a value that depends on the time reference and the secret key. The pseudo-random generator is used in the part corresponding to the integrity control in establishing values in steps 161 (FIG. 6) and 168 (FIG. 6) in the introduction, 263 (FIG. 9) and 264 (FIG. 9) in the extraction.

Generation of the Mapping Vectors

The pairs of steps 118 (FIG. 4)-219 (FIG. 7) of the message with the IP address, 139 (FIG. 5)-239 (FIG. 8) of the time reference message and 161 (FIG. 6)-263 (FIG. 9) of the integrity information generate the mapping vectors $p_{IP}$, $p_{REF}$ and $p_{INT}$ of length LONG_IP, LONG_REF and LONG_INT respectively. The mapping vectors are established pseudo-randomly making them dependent on the secret key for the messages or the time reference and the secret key for the integrity information.

The first step for generating the mapping vectors is to create a vector with all its elements placed to one and determine the sign of the elements of the vector pseudo-randomly. Next, a mask is applied to it to obtain the mapping vector. The mask can be generated responding to psycho visual characteristics or another type of requirement.

An example to produce the mask is creating it so that the weight of the coefficients in the mapping is the same from the perspective of the JPEG standard; to do this, the values of the mask are generated depending on the relation of the size of the quantization steps associated to the JPEG quantization of every coefficient. Previously, it was indicated that every coefficient of the 8|8 blocks into which an image is divided in the JPEG standard is subject to a quantization, where the size of the quantizer step depends on its position in the block. Therefore, the mask is generated so that on mapping the coefficients onto the mapping vector the value of the mask is such that the product of the JPEG quantization step of every coefficient for the value of the mask that multiplies it is constant. This equaling is achieved by assigning, in the mask, the greater value (for example 1) to the element associated to the quantized coefficient with the smaller step and making the rest of the elements of the vector proportional to it. For example, if a coefficient had associated a step size whose value is double that of the smaller coefficient in the mask, half the value associated to the smallest one would correspond to it. Particularizing, if only one coefficient from every block is marked to introduce a determined message, the mask generated would be a vector with its elements the same as the unit. This way of generating the mask is illustrated in the following example $c_{quant} = \{1,1,2,1\}$ $q = \{5,5,6,6\}$.

In the previous case $c_{quant}$ represents the vector formed by the quantized coefficients, the vector q represents the values of the JPEG quantization matrix so that the quantized coefficients $c_{quant}$ are obtained. According to this, the mask m gives $$m=\{1,1,5/6,5/6\}.$$

A mapping vector $p=\{1,-1,5/6,-5/6\}$ may correspond to it.

Insertion of the Watermark

In the result of the RES_PROY mappings a bit of the messages or a part of the integrity information is introduced. This process is carried out in steps 124 of FIG. 4, 145 of FIG. 5 and 168 of FIG. 6 for the IP address, the time reference and the integrity information respectively. The three steps are similar, only differing in the information that is entered in each one.

The system proposed in the present invention uses watermarking techniques with lateral information in the coder, and in the present preferred description a technique is used based on uniform scalar quantizers and coding by repetition.

The messages to insert are represented by binary vectors (their elements can only take the values $\{0,1\}$) wherein every element represents a bit of information:

The message corresponding to the IP address is denoted by $b_{IP}$ and has a length of 32 bits, where this value is denoted in the flow charts of FIG. 4 and FIG. 7 by N°BITS_IP.

The time reference message is denoted by $b_{REF}$ and has a variable length, depending on the channel coding which is applied in step 133 of FIG. 5. This length value is denoted in FIG. 5 and FIG. 8 for N°BITS_REF.

The integrity information is also represented by a binary vector $b_{INT}$ which represents the value of a reference message, introducing a bit in every macroblock, and therefore its length is equal to the number of macroblocks of the image. This reference message is arbitrary, and it must be known by the decoder to be able to verify its presence in the image.

The objective of the watermarking process described in this preferred practical embodiment is to code every message or the integrity information in a vector y which represents a code word, which will be inserted in the original image.

In the method used in this description, every code word y has L times the length of the binary vector which represents the message to insert, L being the repetition rate using N°COEF_IP/LONG_IP, N°COEF_REF/LONG_REF or N°COEF_INT/LONG_INT as corresponds to the IP address, the time reference or the integrity information respectively; in general L will be different for every message or for the integrity information. The process for entering information in the image proposed in this description of the preferred embodiment of the invention comprises three steps: quantization, establishing error vectors and updating the coefficients. These steps will be described in detail below.

In the first step, to insert a message or the integrity information of length N represented by a binary vector $b=(b_1, b_2, \ldots, b_N)$ the elements $y_i$ of the code word y are generated, so that for an element $y_i$ with index i within the interval $[(j-1)\lfloor L+1 j\lfloor L]$ the bit $b_j$ of the corresponding binary vector will be used, with $1\lfloor j\lfloor N$. Where b denotes the vectors $b_{IP}$ or $b_{REF}$ for the case of the messages or $b_{INT}$ for the integrity information. The value i-th is calculated as $$y_i = Q_\Delta\left(x_i - \left(\frac{b_i}{2}+k_i\right)\cdot\Delta\right) + \left(\frac{b_i}{2}+k_i\right)\cdot\Delta \quad (1)$$

where $\lfloor$ is the quantization step, which will determine the distortion introduced by the marking process. On the other hand, in the previous expression (1) $k_i$ represents a pseudo-random value distributed uniformly in the interval $[-1/2, 1/2]$ and it is known only by the coder and the decoder; furthermore, $x_i$ denotes the result of the mapping i-th RES_PROY of the corresponding process of insertion in an image as carried out in the insertion module of the IP address (FIG. 4), in that of the IP address (FIG. 5) or in that of the integrity information (FIG. 6), and where $Q_D(x)$ represents the quantization operation, which due to the particular structure of the code words is simply given by $$Q_\Delta(x) = \Delta \cdot \text{round}\left(\frac{x}{\Delta}\right).$$

Figure 12:
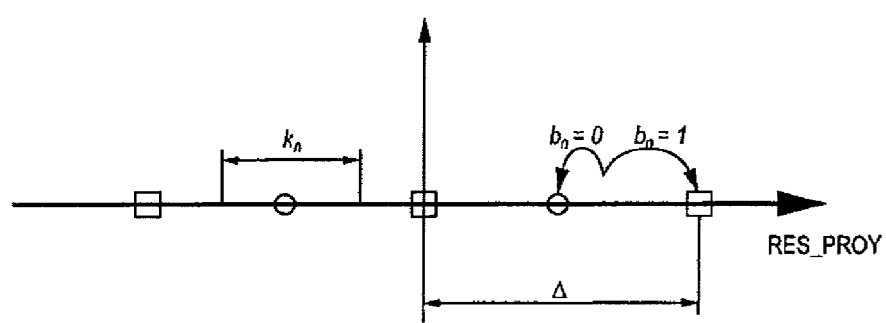
FIG. 12 represents a diagram of the digital watermark insertion process with lateral information in the coder.

The establishment of $y_i$ is graphically represented in FIG. 12, where the circles and the squares symbolize the points of reconstruction which represent the bits 0 and 1, respectively. With respect to the pseudo-random value $k_i$ this can be established from the secret key K or from the time reference for the messages and the secret key in the case of the integrity information. In general, a different value of $k_i$ will be used for every value $x_i$ with the purpose of providing privacy to the marking process. The vector formed by the $k_i$ of every message or integrity information is represented by $k_{IP}$ for the IP address, $k_{REF}$ for the time reference, and $k_{INT}$ for the integrity information.

The second step of the marking process consists of establishing the quantization error vector d, where $d_i$ is established simply as $$d_i = y_i - x_i.$$

Every element $d_i$ is the result of steps 124 (FIG. 4), 145 (FIG. 5) and 168 (FIG. 6).

The third step of the marking process is the updating, operation whereby the value of every $d_i$ is dispersed on all the coefficients of the original image which have been used to establish the value of $x_i$ (which corresponds to a certain RES_PROY value). The updating is carried out in steps 125 (FIG. 4), 146 (FIG. 5) and 169 (FIG. 6). It is supposed that the coefficients of the image, which have been used to establish through the mapping operation the value of RES_PROY which has given rise to $d_i$ in the previous step, are arranged in the vector $c=(c_1, c_2, \ldots, c_M)$, where M is equal to LONG_IP, LONG_REF or LONG_INT, depending on whether the message inserted corresponds to the IP address, the time reference, or the integrity information, respectively. The establishment of the j-th coefficient marking, denoted by $c^*_j$, is given by the following expression:

$$c^*_j = c_j + \alpha \cdot \frac{d^*_i}{p_j},$$

where $d^*_i = d_i | M$, $p_j$ is the j-th element of the corresponding mapping vector (i.e. $p_{IP}$, $p_{REF}$ ó $p_{INT}$), and $\lfloor$ is the distortion compensation factor, which can take real values in the interval $[0,1]$. Controlling the value of $\lfloor$ it is possible to reach a solution of compromise between the distortion introduced and the robustness of the mark.

To conclude the marking process, the original coefficients $c_j$ are replaced by the marked coefficients $c^*_j$.

Distortion Introduced by JPEG

The digital image resulting from altering the coefficients in the insertion of information is again coded according to the JPEG standard. As previously indicated, the JPEG standard quantifies the coefficients of every 8$\lfloor$8 block which forms the image by the elements of the JPEG quantization matrix $Q_{JPEG}$, introducing a quantization noise.

It is necessary to know the values of $Q_{JPEG}$ in the process of inserting the image information, so that it is possible to establish a minimum value of the step size ⌊ necessary to insert the information. This generation process of the elements of the code words y is described in the expression (1), denoting every step size by $D_{IP}$, $D_{REF}$ and $D_{INT}$, for the case of the message with the IP address, message with the time reference and the integrity information respectively.

The determination of the size of the quantizer steps ($D_{IP}$, $D_{REF}$ and $D_{INT}$) depends on the minimum value of the size of the quantization step of $Q_{JPEG}$ ($q_{IP.min}$, $q_{REF.min}$, or $q_{INT.min}$); this value divides the coefficients used to insert every type of information. This achieves that the communication established between the coder 100 and the decoder 200 is possible with a very small distortion. The condition that must be complied with is $$\Delta_{IP} \geq 2 q_{IP,min},$$

$$\Delta_{REF} \geq 2 q_{REF,min} y$$

$$\Delta_{INT} \geq 2 q_{INT,min}.$$

By respecting this condition, it is achieved that the information entered resists JPEG compression at a determined quality factor, where that factor controls $Q_{JPEG}$ This is clear with the example described below. It supposes a factor ⌊=1, without mapping and the result of the quantization error for the introduction of a bit, whose value is zero, is the maximum possible value d=⌊/2. The marked coefficient gives c*=c+Δ/2. If the previous condition is not complied with, the quantized marked value obtained $c^*_{quant}$ would be equal to the value without original quantized marking $c_{quant}$, therefore in the decoder 200 an error would occur on recovering the value of the bit inserted since $ĉ=c^*_{quant} \times q$ would be closer to a code word of the subset associated to the value one than the zero value.

Information Extraction

The extraction process of the information inserted is similar to the marking process, and it can be broken down into two stages. To explain it, we start from a set of coefficient vectors $c=(c_1, c_2 \ldots, c_M)$, $j=1 \ldots N$, which have been marked to transmit information on the j-th bit of a message which has a total length of N bits, this value corresponding to N°BITS_IP or N°BITS_REF for the case of the IP address and the time reference respectively or the number of macroblocks of the image for the integrity information. Furthermore, the value L is the repetition rate used, i.e. N°COEF_IP/LONG_IP, N°COEF_REF/LONG_REF and N°COEF_INT/LONG_INT for the IP address, the time reference and the integrity information, respectively.

The first step of the decoding process consists of establishing a distances vector VEC_DIS=$(v_1, v_2, \ldots, v_N)$. From the mapping of the vector $c_j$ using the suitable parameters a vector $s_j$ of length L, with 1⌊j⌊N, is obtained as a result, and it denotes the concatenation of said N vectors as s. The value of $v_j$ is obtained by the expression $$v_j = \sum_{i=(j-1)\cdot L-1}^{j\cdot L} |Q_\Delta(s_i - k_i \cdot \Delta) - s_i + k_i \cdot \Delta|,$$

with the values of $k_i$ and ⌊ previously defined. The value $v_j$ represents the absolute value of the quantization error of the subvector $s_j$ with the set of code words which represent the bit 0 in the j-th bit, where the code words set has the form of the vector $(\Delta(t_1+k_1), \Delta(t_2+k_2), \ldots, \Delta(t_L+k_L))$, where $t_i$ is a whole number and the pseudo-random values $k_i$ must correspond to those used in the coding phase. The operation (2) is carried out in steps 226 (FIG. 7), 246 (FIG. 8) and 264 (FIG. 9). Depending on the type of message considered, the following step in the decoding process is as described below.

To establish the j-th bit of the IP address (step 217 of FIG. 7), the decision rule is given by $$\hat{b} = \begin{cases} 0, & siv_j \leq L\Delta/4 \\ 1, & siv_j > L\Delta/4 \end{cases},$$

i.e. a criteria of minimum distance will be followed.

The message relating to the time reference is coded against errors using a channel code (e.g. convolutional). In this case, the distances vector VEC_DIS is the entry to the block 235 of FIG. 8, which establishes the binary vector $\hat{b}_{REF}$ at the exit, which represents the estimated message.

The system proposed in the present invention contemplates the recognition of time alterations in the images processed by it. This occurs when an attempt is made to modify an image or a sequence of images is replaced. It is implemented using a time window composed of the value time references which have to be checked with the time reference extracted from every image. If the time reference is within the window, the window is updated with the value of the new time reference. If the time reference extracted is not valid it indicates that the determined image or sequence of images is not valid.

The integrity information is extracted in step 261 of FIG. 9. In this step, the distance between the set of code words associated to a reference message, as well as the mapped version of the coefficients dedicated to integrity of the j-th macroblock, $s_j$ is calculated. If said distance is less than a determined threshold, it will then be decided that the signal is authentic, and in the other case that it has been edited.

Integration in Devices

Note that the flow charts do not use any special syntax, nor any special programming language. Moreover, they represent the information necessary so that a person skilled in the art can manufacture integrated circuits or generate the software that execute the necessary processes. For example, every function represented by a block or a flow chart can be implemented by a set of software instructions, by a DSP digital signal processor, by a FPGA configurable digital circuit, by a specific ASIC application circuit or any combination thereof.

Figure 13:
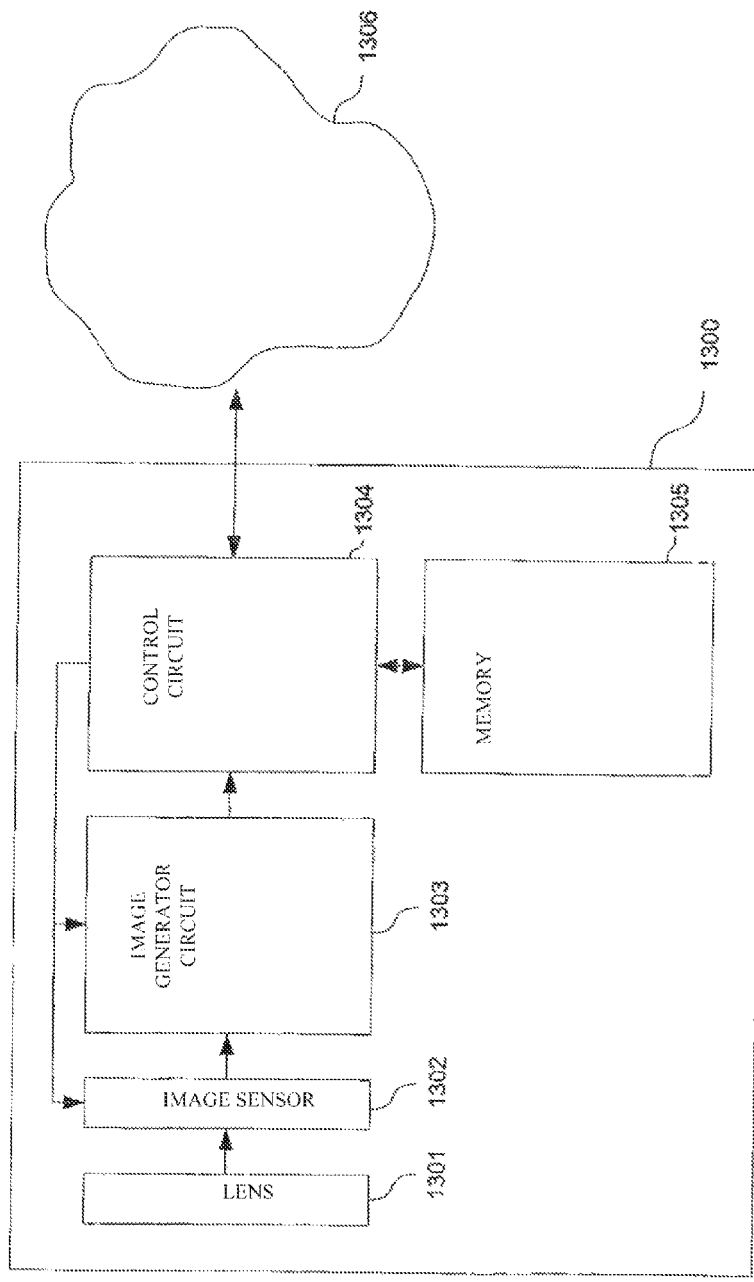
FIG. 13 schematically represents an internal diagram of a digital camera network implementing the insertion methods proposed in the present invention.

In order to illustrate a possible implementation of the watermark insertion methods proposed in the present invention FIG. 13 shows a scheme of blocks of a digital camera network 1300. The camera comprises a lens 1301 which focalizes an image on an image sensor 1302, an image generator circuit 1303 which uses the image captured by the image sensor 1303 producing a coded digital image in accordance with a standard (e.g. JPEG) and a control circuit 1304 having as one of its functions the control of the obtaining, generation and coding of the images, another of its functions being communication with a communications network 1306. Furthermore, the control circuit 1304 has the capacity to execute operations stored in a memory 1305, being therein where the operations necessary to carry out the insertion methods proposed in this invention are saved. Generally, the little calculation capacity of the control circuits present in the current digital network cameras, make the present invention suitable to perfectly conjugate a high degree of security with the need for a low number of operations.

Figure 14:
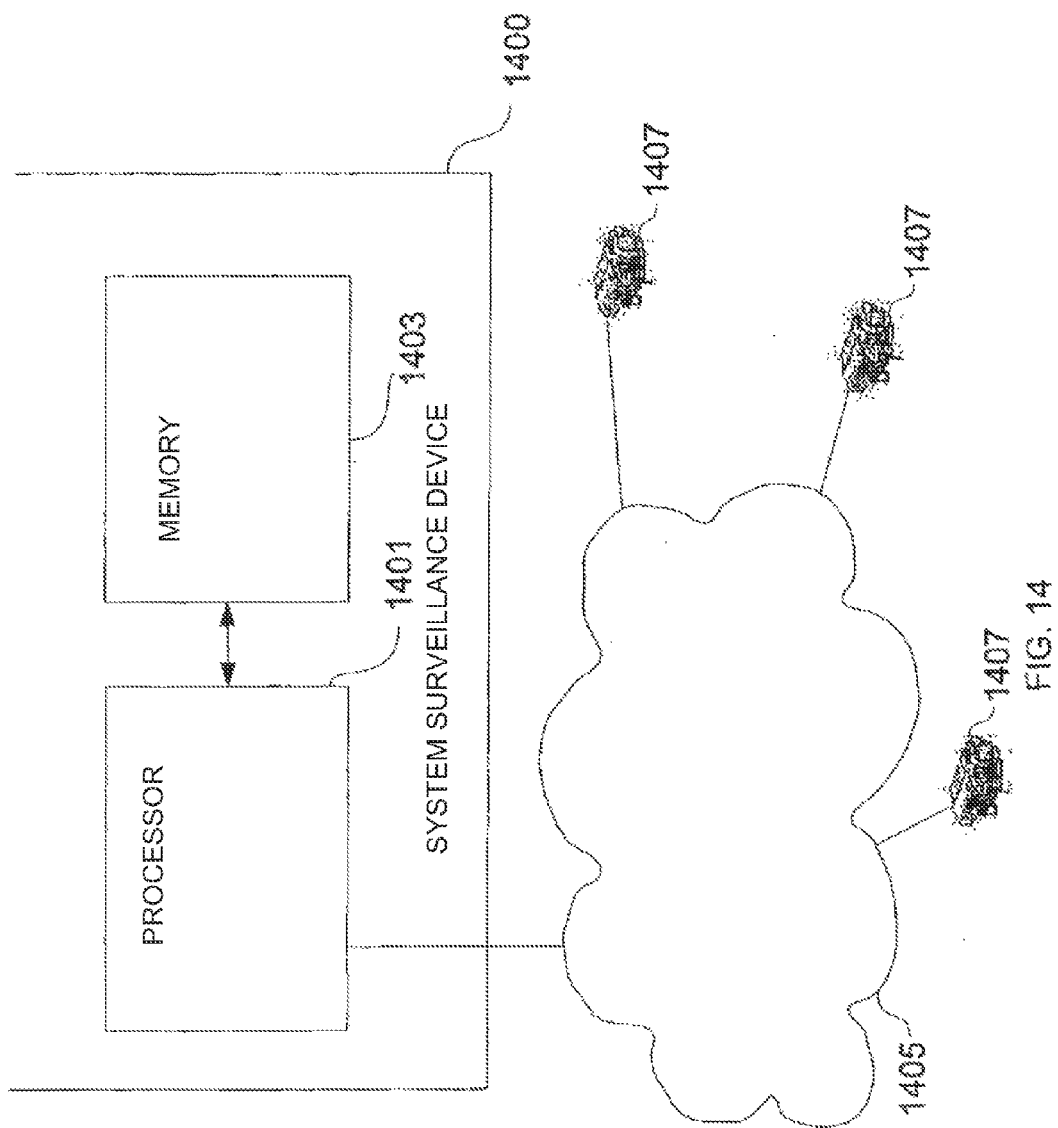
FIG. 14 schematically represents a computational system which executes the methods with manipulation recognition proposed in the present invention, reflecting the interconnection between the devices of a digital video surveillance system.

The methods of marking a digital document with a digital image for the purpose of manipulation recognition proposed in the present invention can be implemented in a computational system 1400, as shown in FIG. 14, where said computational system 1400 would comprise a processor 1401 and a memory 1403. Said computation system 1400 would be connected to system surveillance devices 1407 through a digital communications network 1405. The processor 1401 executes the operations stored in the memory 1403; therefore, the described processes which form part of the methods for the recognition of alterations can be implemented in these computational systems.

By way of example, the computational system 1400 could be a central computer which controls the parameters of the digital cameras which form the overall system or, simply, a DSP configured so that it randomly analyses recordings of a database.

Until now, a possible practical embodiment of the present invention has been detailed. It is evident for a person skilled in the art that there exist variants in the state of the art applicable to the practical embodiment presented. In accordance with this, it should be said that the scope of the present invention will be solely limited by the claims which accompany the invention and not by the content of the preferred description.

The invention claimed is:

1. A method for marking a digital document with a digital image with manipulation recognition for video surveillance systems while inserting integrity information and at least one message, characterized in that the watermarking method comprises the steps of:
   converting the digital image to a converted digital image, dividing up the converted digital image into a plurality of blocks, every block having a plurality of coefficients;
   establishing a plurality of mapped message values for each one of the messages, a plurality of predetermined coefficients being mapped onto a vector that depends on a secret key;
   inserting every bit of every message into a least one of the mapped message values;
   establishing a plurality of mapped integrity values for the integrity information, a plurality of predetermined coefficients being mapped onto a message-dependent vector, said message-dependent vector being derived from at least one of the messages and the secret key;
   inserting every piece of the integrity information into at least one of the mapped integrity values;
   updating every predetermined coefficient that is used for establishing the mapped message values, using the inserted mapped message values, thereby achieving that the mapping of the updated predetermined message coefficients onto the secret key-dependent vector and the inserted mapped message values is identical; and
   updating every predetermined coefficient that is used to calculate the mapped integrity values with the inserted mapped integrity values, thereby achieving that the mapping of the updated predetermined integrity coefficients onto the message-dependent vector and the inserted mapped integrity values is identical.

2. Method according to claim 1, characterized in that the step of inserting every piece of the integrity information is calculated by subjecting the mapped integrity values to a quantization using a lattice quantizer with a predetermined step size and moving the centroids of the lattice quantizer with a displacement vector synchronized with at least one of the messages and the secret key; and the step of inserting every bit of every message is calculated by subjecting said mapped message values to a quantization using a lattice quantizer with a predetermined step size and moving the centroids of the lattice quantizer with a displacement vector synchronized with the secret key.

3. Method according to claim 1, characterized in that every plurality of predetermined coefficients used to insert the messages is selected pseudo-randomly with the secret key.

4. Method according to claim 1, characterized in that every value of said message-dependent vector having a specific position in said message-dependent vector and every value of the secret key-dependent vector having a specific position in the secret key-dependent vector are weighted by a factor, where said factor is derived from said specific position of every value in the vector.

5. Method according to claim 4, characterized in that said digital image is coded with a standard of digital image establishing a coded digital image, where said standard of digital image is selected from the group constituted by the JPEG standard and any of the MPEG standards; every coefficient is coded dividing it up by a value of the quantization table of the standard, where said value of the quantization table depends on the position of the coefficient in the particular block whereto it belongs; and the value of every factor which weighs a particular value of the dependent vector depends on the value of the quantization table which divides a particular coefficient in the coded image, where said particular coefficient multiplies said particular value of the dependent vector to be mapped in steps of establishing the pluralities of mapped values.

6. Method according to claim 1, characterized in that one of said messages is a time reference.

7. Method according to claim 1, characterized in that one of said messages is a unique identifier of a device, where said device captured said digital image.

8. A method according to any of claims 1-7 utilizing a digital camera wherein the digital camera is characterized in that it comprises:
   a lens to focus an image on an image sensor;
   an image generation circuit to generate a digital image from an image captured by said image sensor;
   a control circuit to control the communications between the digital camera and the network whereto it is connected.

9. A method according to any of claims 1 to 7, wherein the method is implemented in a computation system including a processor and a memory.

10. The method of claim 9, wherein the computation system is integrated in a video surveillance system.

11. A method according to any of claims 1 to 7, wherein the method is implemented in a computation system.

12. A method for marking a digital document with a digital image with recognition of manipulation in a digital image with watermark for video surveillance systems, extracting data from said digital image with watermark, where said data are integrity information and at least one message, characterized in that the method of marking a digital document with a digital image comprises the steps of:
   converting the digital image to a converted digital image, dividing the converted image into a plurality of blocks, every block having a plurality of coefficients;
   establishing a plurality of mapped values for every one of said messages, a plurality of predetermined coefficients being mapped onto a vector that depends on a secret key;
   extracting a plurality of bits from every message of the mapped message values;
   for every message determining a reconstructed message based on the bits extracted from every message;

establishing a plurality of mapped integrity values for the integrity information, a plurality of predetermined coefficients being mapped onto a message-dependent vector, which gives rise to at least one of the reconstructed messages and the secret key;

extracting a plurality of pieces of the integrity information of said plurality of mapped integrity values; and determining if the digital image with watermark was altered or not by analysing the pieces extracted from the integrity information.

13. Method according to claim 12, characterized in that the step of extracting a plurality of pieces from the integrity information is calculated by subjecting said mapped integrity values to a quantization using a lattice quantizer with a predetermined step size and moving its lattice quantizer centroids with a displacement vector synchronized with at least one of the reconstructed messages and the secret key; and in the step of extracting a plurality of bits from every message of the mapped values is calculated by subjecting said mapped message value to a quantization using a lattice quantizer with a predetermined step size moving its lattice quantizer centroids with a displacement vector synchronized with the secret key.

14. Method according to claim 12, characterized in that every plurality of predetermined coefficients used to decode the reconstructed message is selected pseudo-randomly with the secret key.

15. Method according to claim 12, characterized in that every value of said message-dependent vector having a specific position in said message-dependent vector and every value of the secret key-dependent vector having a specific position in the secret key-dependent vector are weighted by a factor, where said factor derives from said specific position of every value in the vector.

16. Method according to claim 15, characterized in that said digital image is coded with a digital image standard establishing a coded digital image, where said standard of digital image is selected from the group constituted by the JPEG standard and any of the MPEG standards; every coefficient is coded dividing it up by a value of the quantization table of the standard, where said value of the quantization table depends on the position of the coefficient in the particular block whereto it belongs; and the value of every factor which weights a particular value of the dependent vector depends on the value of the quantization table which divides a particular coefficient in the coded image, where said particular coefficient multiplies said particular value of the dependent vector to be mapped in steps of establishing the pluralities of mapped values.

17. Method according to claim 12, characterized in that one of said messages is a time reference which is used to decide if the digital image with watermark was obtained in a valid time period or suffered a time manipulation.

18. Method according to claim 12, characterized in that one of said messages is a device identifier, where said device captured said image; said device identifier is used to verify if the digital image was altered or not.

19. A method according to any of claims 12 to 18, wherein the method is implemented in a computation system.

* * * * *